(12) United States Patent
Levesque et al.

(10) Patent No.: US 10,606,356 B2
(45) Date of Patent: *Mar. 31, 2020

(54) SYSTEMS AND METHODS FOR HAPTICALLY-ENABLED CURVED DEVICES

(71) Applicant: Immersion Corporation, San Jose, CA (US)

(72) Inventors: Vincent Levesque, Montreal (CA); Danny Grant, Laval (CA); Ali Modarres, Montreal (CA); Jamal Saboune, Montreal (CA)

(73) Assignee: Immersion Corporation, San Jose, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 15/889,335

(22) Filed: Feb. 6, 2018

(65) Prior Publication Data

US 2018/0157327 A1    Jun. 7, 2018

Related U.S. Application Data

(63) Continuation of application No. 14/663,405, filed on Mar. 19, 2015, now Pat. No. 9,921,650.

(Continued)

(51) Int. Cl.
*G06F 1/16* (2006.01)
*G06F 3/01* (2006.01)
*G06F 3/0488* (2013.01)

(52) U.S. Cl.
CPC ........... *G06F 3/016* (2013.01); *G06F 1/1637* (2013.01); *G06F 1/1694* (2013.01); *G06F 3/0488* (2013.01); *G06F 2200/1637* (2013.01)

(58) Field of Classification Search
CPC ................. G06F 3/1626; G06F 3/0412; G06F 2203/013; G06F 1/1637; G06F 1/1626;

(Continued)

(56) References Cited

U.S. PATENT DOCUMENTS 6,072,475 A    6/2000 Van Ketwich
7,292,227 B2    11/2007 Fukumoto et al.
(Continued)

FOREIGN PATENT DOCUMENTS

CN    1228194    9/1999
CN    101517514    8/2009
(Continued)

OTHER PUBLICATIONS

U.S. Appl. No. 14/306,600, filed Jun. 17, 2014, Rihn et al.
(Continued)

*Primary Examiner* — Hong Zhou
(74) *Attorney, Agent, or Firm* — Kilpatrick Townsend & Stockton LLP

(57) ABSTRACT

One illustrative system disclosed herein includes a curved device that includes a curved outer housing. The illustrative system also includes a sensor configured to detect a user interaction with the curved device and transmit a sensor signal associated with the user interaction. The illustrative system additionally includes a processor in communication with the sensor, the processor configured to: receive the sensor signal from the sensor; determine a user interaction based on the sensor signal, determine a first haptic effect based at least in part on the user interaction, and transmit a haptic signal associated with the first haptic effect. The illustrative system also includes a haptic output device configured to receive the haptic signal and output the first haptic effect.

20 Claims, 8 Drawing Sheets

Related U.S. Application Data

(60) Provisional application No. 61/968,753, filed on Mar. 21, 2014.

(58) Field of Classification Search
CPC ...... G06F 3/041; G06F 3/044; G06F 3/03547; G06F 1/1694; G06F 3/016; G06F 3/03488
See application file for complete search history.

(56) References Cited

U.S. PATENT DOCUMENTS

| | | | |
|---|---|---|---|
| 8,157,650 | B2 | 4/2012 | Grant et al. |
| 8,315,652 | B2 | 11/2012 | Grant et al. |
| 8,570,161 | B2 | 10/2013 | Ramsay et al. |
| 8,947,320 | B2 | 2/2015 | King et al. |
| 9,342,174 | B2 | 5/2016 | Watanabe et al. |
| 9,436,280 | B2 | 9/2016 | Tartz et al. |
| 9,746,923 | B2 | 8/2017 | Cruz-Hernandez et al. |
| 2007/0279392 | A1 | 12/2007 | Rosenberg et al. |
| 2008/0287147 | A1 | 11/2008 | Grant et al. |
| 2009/0096746 | A1 | 4/2009 | Kruse et al. |
| 2009/0280860 | A1 | 11/2009 | Dahlke |
| 2010/0013651 | A1 | 1/2010 | Spalink |
| 2010/0017759 | A1 | 1/2010 | Birnbaum et al. |
| 2010/0245246 | A1 | 9/2010 | Rosenfeld et al. |
| 2010/0328229 | A1 | 12/2010 | Weber et al. |
| 2010/0328230 | A1 | 12/2010 | Faubert et al. |
| 2011/0261002 | A1 | 10/2011 | Verthein |
| 2012/0229400 | A1 | 9/2012 | Birnbaum et al. |
| 2012/0327004 | A1 | 12/2012 | Mikladal et al. |
| 2013/0009892 | A1* | 1/2013 | Salmela ............... G06F 3/016 345/173 |
| 2013/0177177 | A1 | 7/2013 | Lundin |
| 2013/0197819 | A1 | 8/2013 | Vanska et al. |
| 2013/0293494 | A1 | 11/2013 | Reshef |
| 2014/0062892 | A1 | 3/2014 | Dickinson et al. |
| 2014/0141841 | A1 | 5/2014 | Yeo et al. |
| 2014/0281956 | A1* | 9/2014 | Anderson ............ G06F 3/0482 715/702 |
| 2014/0320435 | A1 | 10/2014 | Modarres et al. |
| 2014/0354570 | A1 | 12/2014 | Makinen et al. |
| 2015/0009168 | A1 | 1/2015 | Levesque et al. |
| 2015/0042573 | A1 | 2/2015 | Grant et al. |
| 2015/0062025 | A1* | 3/2015 | Lee ...................... G06F 3/0412 345/173 |
| 2015/0070382 | A1 | 3/2015 | Anderson |
| 2015/0187188 | A1 | 7/2015 | Raskin |
| 2015/0241970 | A1 | 8/2015 | Park et al. |
| 2016/0216767 | A1 | 7/2016 | Modarres et al. |

FOREIGN PATENT DOCUMENTS

| | | |
|---|---|---|
| CN | 102187647 A | 9/2011 |
| CN | 102362246 | 2/2012 |
| CN | 102696002 | 9/2012 |
| CN | 102804105 | 11/2012 |
| EP | 2 385 684 | 11/2011 |
| JP | 2002-149312 A | 5/2002 |
| JP | 2004-362428 A | 12/2004 |
| JP | 2008-157295 A | 7/2008 |
| JP | 2012-503244 A | 2/2012 |
| WO | 2010/032223 A1 | 3/2010 |
| WO | 2012/001464 A1 | 1/2012 |
| WO | 2012/129247 A2 | 9/2012 |
| WO | 2013/035587 A1 | 3/2013 |
| WO | 2013/118769 A1 | 8/2013 |

OTHER PUBLICATIONS

U.S. Appl. No. 14/465,005, filed Aug. 21, 2014, Levesque et al.
U.S. Appl. No. 14/552,987, filed Nov. 25, 2014, Levesque et al.
Cirio, G. et al., Vibrotactile Rendering of Splashing Fluids, IEEE Transactions on Haptics, vol. 6, No. 1, pp. 117-122, 2013.
AndEngine—Free Android 2D OpenGL Game Engine, Web page atas available via the Internet, dated Jan 22, 2013.
PhysX—GeForce, web page at http://www.geforce.com/hardware/technology/physx/technology, as available via the Internet and printed Mar. 18, 2015.
PhysX, web page at http://en.wikipedia.org/wiki/PhysX, as available via the Internet and printed Mar. 17, 2015.
HandOff on Mac—web page at https://www.apple.com/ios/whats-new/continuity, as available via the Internet and printed Mar. 18, 2015.
How to Get 'Handoff' Working in OS X Yosemite and iOS 8, web page at http://www.macrumors.com/2014/10/24/how-to-handoff-not-working/, as available via the Internet, dated Oct. 24, 2014.
Patent Cooperation Treaty, International Search Report and Written Opinion, International Application No. PCT/US2015/021416, dated Jun. 18, 2015.
CN 201580015082.X, "Office Action," dated Dec. 5, 2018, 16 pages.
JP 2017-501107, "Office Action", dated Oct. 2, 2018, 6 pages.
European Application No. EP15713124.4 , "Office Action", dated Feb. 22, 2019, 6 pages.
Andronavi, "'ATilt 3D Labyrinth Free'—Tilt the terminal and roll the ball to the goal! Game application in which 3D graphics are fun," andronavi (2011), Available Online at: https://andronavi.com/2011/09/123726, Accessed from Internet on Jul. 2, 2019, 5 pages.
JP 2017-501107, "Office Action," dated Apr. 2, 2019, 6 pages.
CN 201580015082.X "Office Action," dated Jul. 8, 2019, 12 pages.
Chinese Application No. CN201580015082.X , "Notice of Decision to Grant", dated Oct. 29, 2019, 6 pages.

* cited by examiner

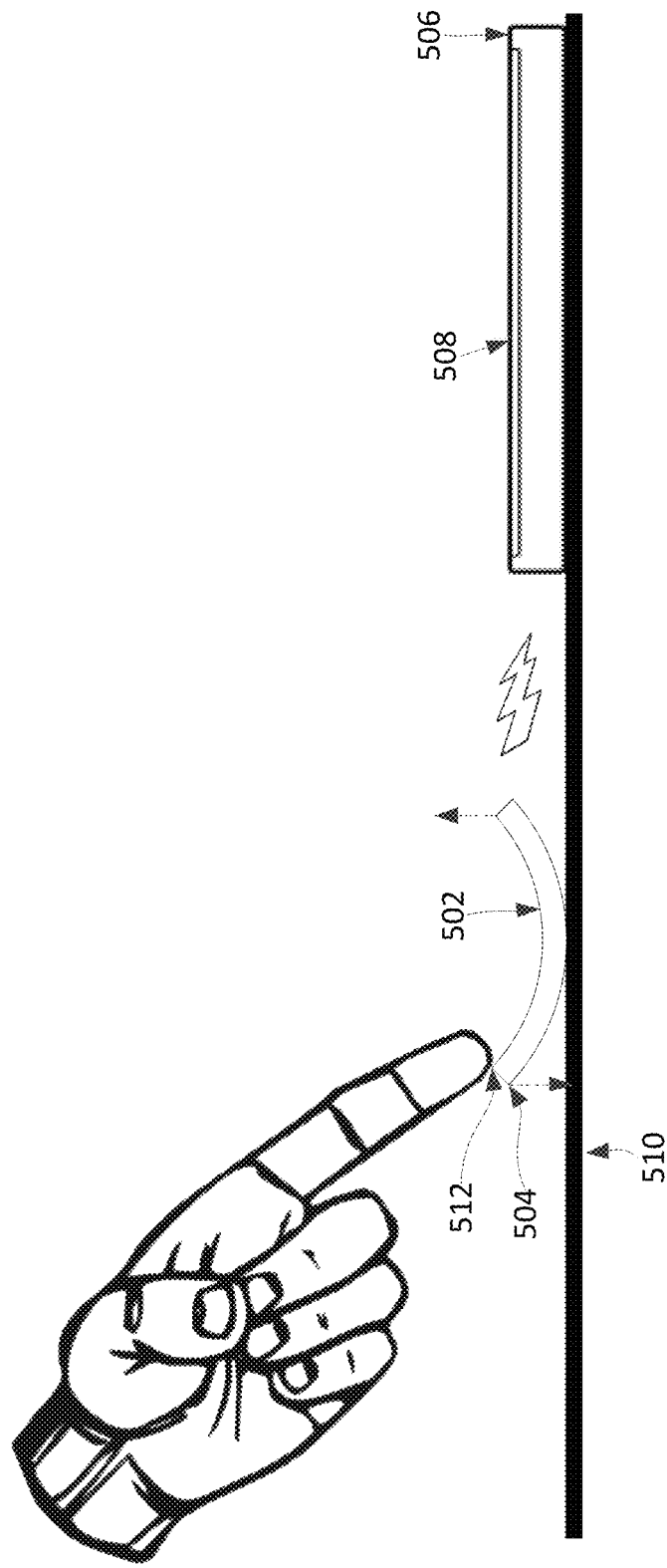

SYSTEMS AND METHODS FOR HAPTICALLY-ENABLED CURVED DEVICES

REFERENCE TO RELATED APPLICATION

This application is a continuation of and claims priority to U.S. patent application Ser. No. 14/663,405, filed Mar. 19, 2015, entitled "Systems and Methods for Haptically-Enabled Curved Devices," which claims priority to U.S. Provisional Patent Application No. 61/968,753, entitled "Physical Simulation on Rounded Device," filed Mar. 21, 2014, the entirety of all of which is hereby incorporated herein by reference.

FIELD OF THE INVENTION

The present invention relates to the field of user interface devices. More specifically, the present invention relates to haptically-enabled curved devices.

BACKGROUND

As computer-based systems become more prevalent, the quality of the interfaces through which humans interact with these systems is becoming increasingly important. Recently, curved computing devices have been developed. Curved computing devices may comprise outer housings (and other components, such as displays) that are permanently curved around one or more axes. Curved computing devices may provide users with unique interfaces and user experiences. Some curved computing devices, however, may lack haptic feedback capabilities.

SUMMARY

Embodiments of the present disclosure comprise haptically-enabled curved devices. In one embodiment, a system of the present disclosure may comprise a curved device comprising a curved outer housing. The system may also comprise a sensor configured to detect a user interaction with the curved device and transmit a sensor signal associated with the user interaction. The system may also comprise a processor in communication with the sensor, the processor configured to: receive the sensor signal from the sensor; determine a user interaction based on the sensor signal; determine a first haptic effect based at least in part on the user interaction, and transmit a haptic signal associated with the first haptic effect. The system may further comprise a haptic output device configured to receive the haptic signal and output the first haptic effect.

In another embodiment, a method of the present disclosure may comprise: receiving a sensor signal from a sensor configured to detect a user interaction with a curved device, the curved device comprising a curved outer housing. The method may also comprise determining a user interaction based on the sensor signal, determining a first haptic effect based at least in part on the user interaction, and transmitting a haptic signal associated with the first haptic effect to a haptic output device. The haptic output device may be configured to receive the haptic signal and output the first haptic effect. Yet another embodiment comprises a computer-readable medium for implementing such a method.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

FIG. 5 shows another embodiment of a system for haptically-enabled curved devices.

DETAILED DESCRIPTION

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Examples of Haptically-Enabled Curved Devices

Figure 1A:
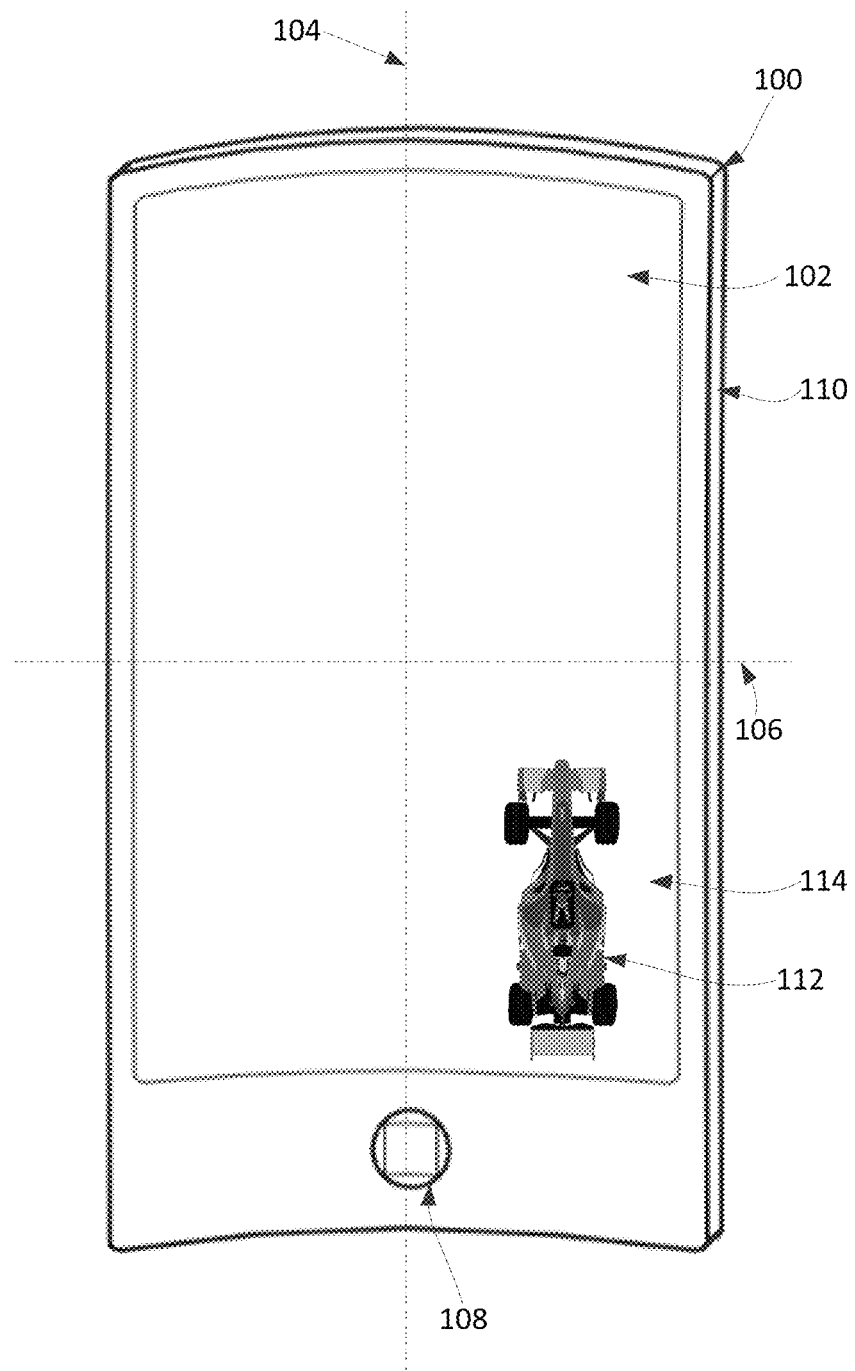
FIG. 1A shows an illustrative embodiment of a system for haptically-enabled curved devices.

FIG. 1A shows an illustrative embodiment of a system for haptically-enabled curved devices. In this illustrative embodiment, the system comprises a computing device 100, such as a tablet, e-reader, or mobile phone (e.g., a smartphone). The computing device 100 comprises a touch-screen display 102, a memory, and a processor in communication with each of these elements.

In the illustrative embodiment, the computing device 100 is curved. A curved computing device 100 comprises an outer housing 110 that is curved around one or more axes 104 or 106. In one embodiment, the curved computing device 100 is permanently curved. In another embodiment, the curved computing device 100 may be deformable (e.g., bendable or flexible) around one or more axis, e.g., to a curve shape. The user may deform the computing device 100 and/or the computing device 100 may deform itself (e.g., by outputting a deformation haptic effect, as described in greater detail with respect to FIG. 2). In the embodiment shown in FIG. 1A, the computing device 100 is curved around the Y-axis 104. In other embodiments, the computing device 100 may additionally or alternatively be curved around the X-axis 106. For instance, the computing device 100 may be curved around both the X-axis 106 and the Y-axis 104, e.g., such that the computing device 100 has a bowl shape. In some embodiments, the computing device 100 comprises other curved components, such as a curved touch-screen display 102, button 108, and/or other user interface components.

In the illustrative embodiment, the computing device 100 comprises a haptic output device. The haptic output device is configured to receive a haptic signal from the processor and output one or more haptic effects (e.g., textures, vibrations, stroking sensations, stinging sensations, and/or changes in perceived coefficient of friction).

In the illustrative embodiment, the computing device 100 is configured to output a haptic effect (via the haptic output device) based on a user interaction with the computing device 100. For example, the computing device 100 may execute a video game, such as a virtual racing game. The computing device 100 may be configured to detect a user interacting with (e.g., tapping, touching, or gesturing on) a virtual racecar displayed on the touch-screen display 102. For example, the computing device 100 may detect a user contacting the virtual racecar with a finger and dragging the finger to the right 114 of the touch-screen display 102, e.g., to move the virtual racecar to the right 114 on a virtual racetrack. This may prevent the virtual racecar from impacting another virtual object, such as another virtual car, on the racetrack. In the illustrative embodiment, the computing device 100 determines a haptic effect associated with the user interaction and outputs the haptic effect.

Figure 1B:
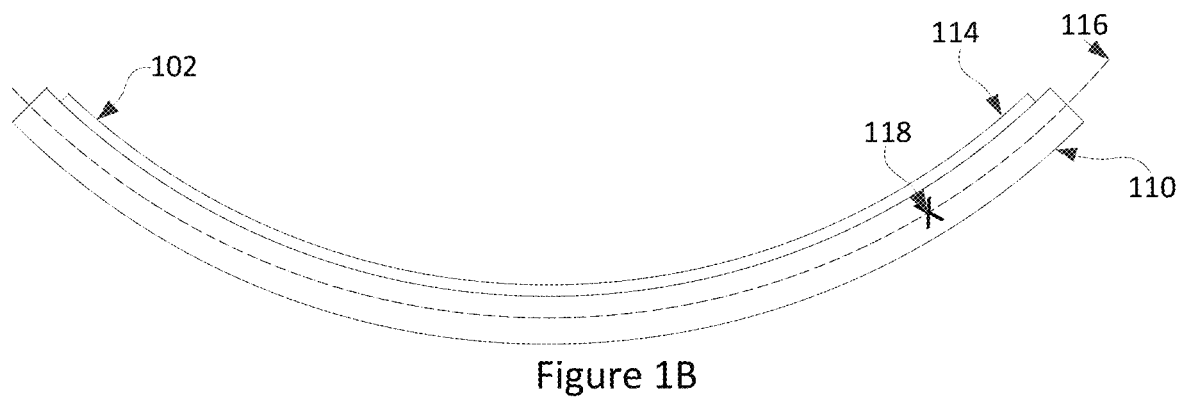
FIG. 1B shows another embodiment of a system for haptically-enabled curved devices.

In the illustrative embodiment, the computing device 100 determines the haptic effect based at least in part on a curvature (e.g., an angle or amount of curvature) of the computing device 100. For example, referring to FIG. 1B, the computing device 100 may determine a location 118 along the curvature 116 in which the virtual object 112 (e.g., the virtual racecar) is output on the touch-screen display 102. In some embodiments, the computing device 100 may determine a characteristic (e.g., magnitude, frequency, duration, and/or type) of the haptic effect based on the location 118 along the curvature 116. For example, as the virtual racecar moves to the right 114 of the touch-screen display 102 (e.g., farther up the slope of the curvature 116), the computing device 100 may determine a haptic effect comprising a vibration with increasing magnitude. In some embodiments, the computing device 100 may increase the magnitude of the vibration by an amount corresponding to the increasing slope of the curvature 116. This may simulate forces on the virtual racecar as the racecar drives along a racetrack with an increasing banking angle.

In the illustrative embodiment, the computing device 100 may determine the haptic effect based at least in part on a location 118 along the curvature 116 in which a user is contacting the touch-screen display 102. For instance, in the virtual racecar embodiment described above, as the user swipes a finger to the right 114 of the touch-screen display 102 (e.g., up the slope of the curvature 116), the computing device 100 may determine an associated haptic effect. The haptic effect may be configured to, e.g., increase the perceived coefficient of friction between the user's finger and the touch-screen display 102 by an amount corresponding to the increasing slope of the curvature 116. This may increase the force resisting against the user sliding a finger across the touch-screen display 102. In some embodiments, the resistance may simulate gravitational forces, e.g., pulling on the virtual racecar as the racecar drives up the increasing banking in the virtual racetrack.

The description of the illustrative embodiment above is provided merely as an example. Various other embodiments of the present invention are described herein and variations of such embodiments would be understood by one of skill in the art. Advantages offered by various embodiments may be further understood by examining this specification and/or by practicing one or more embodiments of the claimed subject matter.

Illustrative Systems for Haptically-Enabled Curved Devices

Figure 2:
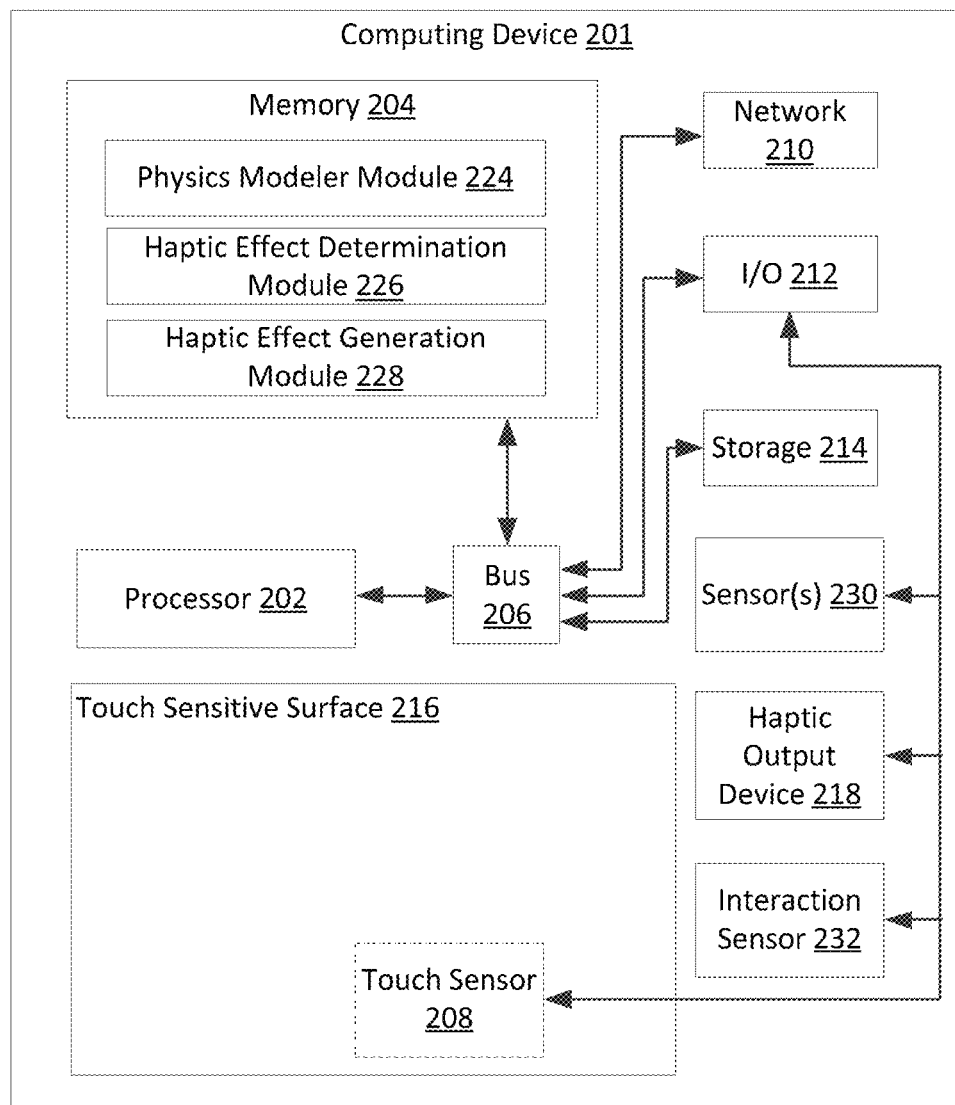
FIG. 2 is a block diagram showing a system for haptically-enabled curved devices.

FIG. 2 is a block diagram showing a computing device 201 for haptically-enabled curved devices according to one embodiment. The computing device 201 may comprise a mobile device (e.g., smartphone), tablet, e-reader, game controller, gamepad, remote control, and/or a portable gaming device. Although depicted as planar in FIG. 2, in some embodiments, the computing device 201 is curved (e.g., around one or more axes).

In some embodiments, the components (e.g., the processor 202, network interface device 210, haptic output device 218, sensor 230, etc.) of the computing device 201 may be integrated into a single housing. In other embodiments, the components may be distributed (e.g., among multiple housings or locations) and in electrical communication with one another. The computing device 201 may or may not comprise all of the components depicted in FIG. 2. For example, in some embodiments, the computing device 201 may not comprise the sensor 230.

The computing device 201 comprises a processor 202 interfaced with other hardware via bus 206. A memory 204, which can comprise any suitable tangible (and non-transitory) computer-readable medium such as RAM, ROM, EEPROM, or the like, may embody program components that configure operation of the computing device 201. In some embodiments, the computing device 201 may further comprise one or more network interface devices 210, input/output (I/O) interface components 212, and additional storage 214.

Network interface device 210 can represent one or more of any components that facilitate a network connection or otherwise facilitate communication between electronic devices. Examples include, but are not limited to, wired interfaces such as Ethernet, USB, IEEE 1394, and/or wireless interfaces such as IEEE 802.11, Bluetooth, near-field communication (NFC) interfaces, RFID interfaces, or radio interfaces for accessing cellular telephone networks (e.g., transceiver/antenna for accessing a CDMA, GSM, UMTS, or other mobile communications network).

I/O components 212 may be used to facilitate connection to devices such as one or more displays, touch sensitive surfaces 216, keyboards, mice, speakers, microphones, buttons, and/or other hardware used to input data or output data. Storage 214 represents nonvolatile storage such as read-only memory, flash memory, ferroelectric RAM (F-RAM), magnetic, optical, or other storage media included in the computing device 201 or coupled to processor 202.

The computing device 201 may comprise a touch sensitive surface 216. In some embodiments, the touch sensitive surface 216 is curved. Touch sensitive surface 216 represents any surface that is configured to sense tactile input of a user. One or more touch sensors 208 are configured to detect a touch in a touch area (e.g., when an object contacts a touch sensitive surface 216) and transmit signals associated with the touch to processor 202. Any suitable number, type, or arrangement of touch sensors 208 can be used. For example, in some embodiments, resistive and/or capacitive sensors may be embedded in touch sensitive surface 216 and used to determine the location of a touch and other information, such as pressure, speed, direction, and/or the proximity of a user's finger to the touch sensitive surface 216. In such an embodiment, capacitive sensors may detect the proximity of a user's finger to the touch sensor 208 (e.g., embedded in the touch sensitive surface 216). For example, the touch sensor 208 may comprise a capacitive sensor configured to detect a change in capacitance as a user's finger approaches the touch sensor 208. The touch sensor 208 may determine whether the user's finger is within a particular distance of the touch sensor 208 based on the change in capacitance.

The touch sensor 208 can additionally or alternatively comprise other types of sensors. For example, optical sensors with a view of the touch sensitive surface 216 may be used to determine the touch position. As another example, the touch sensor 208 may comprise a LED (Light Emitting Diode) finger detector mounted on the side of a display. In some embodiments, touch sensor 208 may be configured to detect multiple aspects of the user interaction. For example, touch sensor 208 may detect the speed, pressure, and direction of a user interaction, and incorporate this information into the signal transmitted to the processor 202.

In some embodiments, the computing device 201 comprises a touch-enabled display that combines a touch sensitive surface 216 and a display of the device. The touch sensitive surface 216 may correspond to the display exterior or one or more layers of material above components of the display. In other embodiments, touch sensitive surface 216 may not comprise (or otherwise correspond to) a display, depending on the particular configuration of the computing device 201.

In some embodiments, the computing device 201 comprises an interaction sensor 232. The interaction sensor 232 may comprise an accelerometer, gyroscope, camera, pressure sensor, and/or capacitive sensor. The interaction sensor 232 is configured to detect a user interaction with the computing device 201 and transmit a sensor signal associated with the user interaction to processor 202. For example, the interaction sensor 232 (e.g., an accelerometer) may be configured to detect a user rocking the curved computing device 201 back-and-forth on a surface (e.g., a table or desk) and transmit an associated sensor signal to the processor 202.

In some embodiments, the computing device 201 comprises one or more additional sensor(s) 230. The sensor(s) 230 are configured to transmit sensor signals to the processor 202. The sensor(s) 230 may comprise, for example, a humidity sensor, ambient light sensor, gyroscope, GPS unit, accelerometer, range sensor, depth sensor, biosensor, camera, and/or temperature sensor. In some embodiments, the sensor 230 is external to computing device 201 and in wired or wireless communication with the computing device 201. For example, the sensor 130 may comprise a biosensor configured to be worn by a user. The sensor 230 may wirelessly transmit signals associated with a physiological status of the user to the processor 202. In some embodiments, the processor 202 may analyze the sensor signals to determine whether to output a haptic effect (e.g., via haptic output device 218).

In some embodiments, the computing device 201 comprises a haptic output device 218 in communication with the processor 202. The haptic output device 218 is configured to output a haptic effect in response to a haptic signal. In some embodiments, the haptic output device 218 is configured to output a haptic effect comprising a vibration, a change in a perceived coefficient of friction, a simulated texture, a change in temperature, a stroking sensation, an electro-tactile effect, or a surface deformation (e.g., a deformation of a surface associated with the computing device 201). Further, some haptic effects may use multiple haptic output devices 218 of the same or different types in sequence and/or in concert. Although a single haptic output device 218 is shown in FIG. 2, embodiments may use multiple haptic output devices 218 of the same or different type to produce haptic effects.

In some embodiments, the haptic output device 218 is external to computing device 201 and in communication with the computing device 201 (e.g., via wired interfaces such as Ethernet, USB, IEEE 1394, and/or wireless interfaces such as IEEE 802.11, Bluetooth, or radio interfaces). For example, the haptic output device 218 may associated with (e.g., coupled to) a wearable device and configured to receive haptic signals from the processor 202.

In some embodiments, the haptic output device 218 is configured to output a haptic effect comprising a vibration. The haptic output device 218 may comprise, for example, one or more of a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA).

In some embodiments, the haptic output device 218 is configured to output a haptic effect modulating the perceived coefficient of friction of a surface associated with the haptic output device 218. In one embodiment, the haptic output device 218 comprises an ultrasonic actuator. An ultrasonic actuator may vibrate at an ultrasonic frequency, for example 20 kHz, increasing or reducing the perceived coefficient of an associated surface. In some embodiments, the ultrasonic actuator may comprise a piezo-electric material.

In some embodiments, the haptic output device 218 uses electrostatic attraction, for example by use of an electrostatic actuator, to output a haptic effect. The haptic effect may comprise a simulated texture, a simulated vibration, a stroking sensation, or a perceived change in a coefficient of friction on a surface associated with computing device 201. In some embodiments, the electrostatic actuator may comprise a conducting layer and an insulating layer. The conducting layer may be any semiconductor or other conductive material, such as copper, aluminum, gold, or silver. The insulating layer may be glass, plastic, polymer, or any other insulating material. Furthermore, the processor 202 may operate the electrostatic actuator by applying an electric signal, for example an AC signal, to the conducting layer. In some embodiments, a high-voltage amplifier may generate the AC signal. The electric signal may generate a capacitive coupling between the conducting layer and an object (e.g., a user's finger or other body part, or a stylus) near or touching the haptic output device 218. Varying the levels of attraction between the object and the conducting layer can vary the haptic effect perceived by a user.

In some embodiments, the haptic output device 218 comprises a deformation device configured to output a deformation haptic effect. The deformation haptic effect may comprise raising or lowering portions of a surface associated with the computing device 201. For example, the deformation haptic effect may comprise raising portions of the touch sensitive surface 216. In some embodiments, the deformation haptic effect may comprise bending, folding, rolling, twisting, squeezing, flexing, changing the shape of, or otherwise deforming a surface associated with the computing device 201. For example, the deformation haptic effect may apply a force on the computing device 201 or a surface associated with the computing device 201, causing it to bend, fold, roll, twist, squeeze, flex, change shape, or otherwise deform. For instance, if the computing device 201 is executing a virtual skateboarding half-pipe game, the deformation haptic effect may comprise bending the computing device 201 in an amount corresponding to the bend in the virtual half pipe. This may more realistically simulate features of the virtual half pipe for the user.

In some embodiments, the haptic output device 218 comprises fluid configured for outputting a deformation haptic effect (e.g., for bending or deforming a surface associated with the computing device 201). For example, the fluid may comprise a smart gel. A smart gel comprises a fluid with mechanical or structural properties that change in response to a stimulus or stimuli (e.g., an electric field, a magnetic field, temperature, ultraviolet light, shaking, or a pH variation). For instance, in response to a stimulus, a smart gel may change in stiffness, volume, transparency, and/or color. In some embodiments, stiffness may comprise the resistance of a surface associated with the computing device 201 against deformation. In some embodiments, one or more wires may be embedded in or coupled to the smart gel. As current runs through the wires, heat is emitted, causing the smart gel to expand or contract. This may cause the computing device 201 or a surface associated with the computing device 201 to deform.

As another example, the fluid may comprise a rheological (e.g., a magneto-rheological or electro-rheological) fluid. A rheological fluid comprises metal particles (e.g., iron particles) suspended in a fluid (e.g., oil or water). In response to an electric or magnetic field, the order of the molecules in the fluid may realign, changing the overall damping and/or viscosity of the fluid. This may cause the computing device 201 or a surface associated with the computing device 201 to deform.

In some embodiments, the haptic output device 218 comprises a mechanical deformation device. For example, in some embodiments, the haptic output device 218 may comprise an actuator coupled to an arm that rotates a deformation component. The deformation component may comprise, for example, an oval, starburst, or corrugated shape. The deformation component may be configured to move a surface associated with the computing device 201 at some rotation angles but not others. The actuator may comprise a piezo-electric actuator, rotating/linear actuator, solenoid, an electroactive polymer actuator, macro fiber composite (MFC) actuator, shape memory alloy (SMA) actuator, and/or other actuator. As the actuator rotates the deformation component, the deformation component may move the surface, causing it to deform. In such an embodiment, the deformation component may begin in a position in which the surface is flat. In response to receiving a signal from processor 202, the actuator may rotate the deformation component. Rotating the deformation component may cause one or more portions of the surface to raise or lower. The deformation component may, in some embodiments, remain in this rotated state until the processor 202 signals the actuator to rotate the deformation component back to its original position.

Further, other techniques or methods can be used to deform a surface associated with the computing device 201. For example, the haptic output device 218 may comprise a flexible surface layer configured to deform its surface or vary its texture based upon contact from a surface reconfigurable haptic substrate (including, but not limited to, e.g., fibers, nanotubes, electroactive polymers, piezoelectric elements, or shape memory alloys). In some embodiments, the haptic output device 218 is deformed, for example, with a deforming mechanism (e.g., a motor coupled to wires), air or fluid pockets, local deformation of materials, resonant mechanical elements, piezoelectric materials, micro-electro-mechanical systems ("MEMS") elements or pumps, thermal fluid pockets, variable porosity membranes, or laminar flow modulation.

In some embodiments, the haptic output device 218 may be a portion of the housing of the computing device 201. In other embodiments, the haptic output device 218 may be housed inside a flexible housing overlaying a surface associated with the computing device 201 (e.g., the front or back of the computing device 201). For example, the haptic output device 218 may comprise a layer of smart gel overlaying the curved back of the computing device 201. Upon actuating the haptic output device 218 (e.g., with an electric current or an electric field), the smart gel may expand or deform in shape. This may cause the computing device 201 to roll along a surface toward a side of the computing device 201. The user may perceive the rolling as a haptic effect.

Turning to memory 204, modules 224, 226, and 228 are depicted to show how a device can be configured in some embodiments to provide haptically-enabled curved devices. In some embodiments, physics modeler module 224 represents a program component that comprises physics modeling software (e.g., AndEngine or PhysX by NVIDIA Corporation®) for modeling natural laws (e.g., conservation of energy, Newton's laws, gravity, and other natural phenomena) in a simulated environment. The physics modeler module 224 may comprise code that dictates how virtual objects move and/or interact within the simulated environment, e.g., based on various characteristics (e.g., virtual sizes, shapes, materials, densities, and weights) of the virtual objects. For example, the physics modeler module 224 may comprise code that determines a force of impact between two virtual objects within the simulated environment based on the densities and weights of the virtual objects. In some embodiments, physics modeler module 224 may comprise code that determines how virtual objects move and/or interact within the simulated environment based on characteristics (e.g., orientation, curvature in, size, and shape) of the computing device 201. For example, the physics modeler module 224 may comprise code that determines how a virtual object moves within the simulated environment based on the curvature in the computing device 201.

In some embodiments, haptic effect determination module 226 represents a program component that analyzes data to determine a haptic effect to generate. The haptic effect determination module 226 may comprise code that selects one or more haptic effects to output using one or more algorithms or lookup tables. In some embodiments, the haptic effect determination module 226 comprises one or more algorithms or lookup tables useable by the processor 202 to determine a haptic effect.

In some embodiments, haptic effect determination module 226 comprises code that determines a haptic effect to output based on the curvature of the computing device 201. In one embodiment, the haptic effect determination module 226 may determine a haptic effect if the user interacts with the computing device 201 at a particular location along the curvature of the computing device 201. For example, the computing device 201 may detect the user sliding a finger up the slope of the curved computing device 201 and output a haptic effect comprising, e.g., a vibration with an increasing magnitude. This user may perceive the vibration and be able to determine, e.g., the position of the user's finger along the curvature in the computing device 201, without having to visually focus on the computing device 201. As another example, the haptic effect determination module 126 may determine a haptic effect comprising a long vibration based on a user tapping the computing device 201 (e.g., the touch sensitive surface 216) at a particular location along the curvature of the computing device 201.

In some embodiments, haptic effect determination module 226 comprises code that determines a haptic effect based on a simulated physics model from the physics modeler module 224. For example, the physics modeler module 224 may determine the magnitude of a simulated impact of a virtual object against a virtual side of a display (e.g., as the virtual object bounces around the display). In one embodiment, the haptic effect determination module 226 may determine a characteristic (e.g., magnitude, duration, location, type, frequency, etc.) of a haptic effect based on the magnitude of the simulated impact. For example, in one such embodiment, if the simulated impact has a high magnitude, the haptic effect determination module 226 may determine a haptic effect (e.g., a vibration) comprising a high magnitude and/or a high frequency. If the simulated impact has a low magnitude, the haptic effect determination module 226 may determine a haptic effect (e.g., a vibration) with a low magnitude and/or frequency, a different type of haptic effect (e.g., a jolt sensation), or no haptic effect at all.

In some embodiments, the haptic effect determination module 226 comprises code that determines a haptic effect based on an event. An event, as used herein, is any interaction, action, collision, or other event which occurs during operation of the computing device 201 which can potentially comprise an associated haptic effect. In some embodiments, an event may comprise user input (e.g., a button press, manipulating a joystick, interacting with a touch sensitive surface 216, tilting or orienting the device), a system status (e.g., low battery, low memory, or a system notification, such as a notification generated based on the system receiving an incoming phone call), sending data, receiving data, or a program event (e.g., if the program is a game, a program event may comprise explosions, gunshots, collisions, interactions between game characters, advancing to a new level, or driving over bumpy terrain).

For example, in some embodiments, the processor 202 may receive a sensor signal associated with an event that occurred on the computing device 201. The event may comprise, for example, the computing device 201 receiving an incoming phone call. Based on the event, the haptic effect determination module 226 may determine a haptic effect comprising, e.g., rolling the curved computing device 201 toward the user. This may notify a user of the incoming call, which may be beneficial, for example, if the user has a ringer of the computing device 201 on silent.

Haptic effect generation module 228 represents programming that causes processor 202 to generate and transmit haptic signals to the haptic output device 218 to generate the selected haptic effect. For example, the haptic effect generation module 228 may access stored waveforms or commands to send to the haptic output device 218 to create the desired effect. In some embodiments, the haptic effect generation module 228 may comprise algorithms to determine the haptic signal. Further, in some embodiments, haptic effect generation module 228 may comprise algorithms to determine target coordinates for the haptic effect (e.g., coordinates for a location on the computing device 201, such as on the touch sensitive surface 216, at which to output a haptic effect).

Although the modules 224, 226, and 228 are depicted in FIG. 2 as program components within the memory 204, in some embodiments, the modules 224, 226, and 228 may comprise hardware. For example, modules 224, 226, and 228 may comprise analog to digital converters, processors, microcontrollers, comparators, amplifiers, transistors, and other analog or digital circuitry.

Figure 3A:
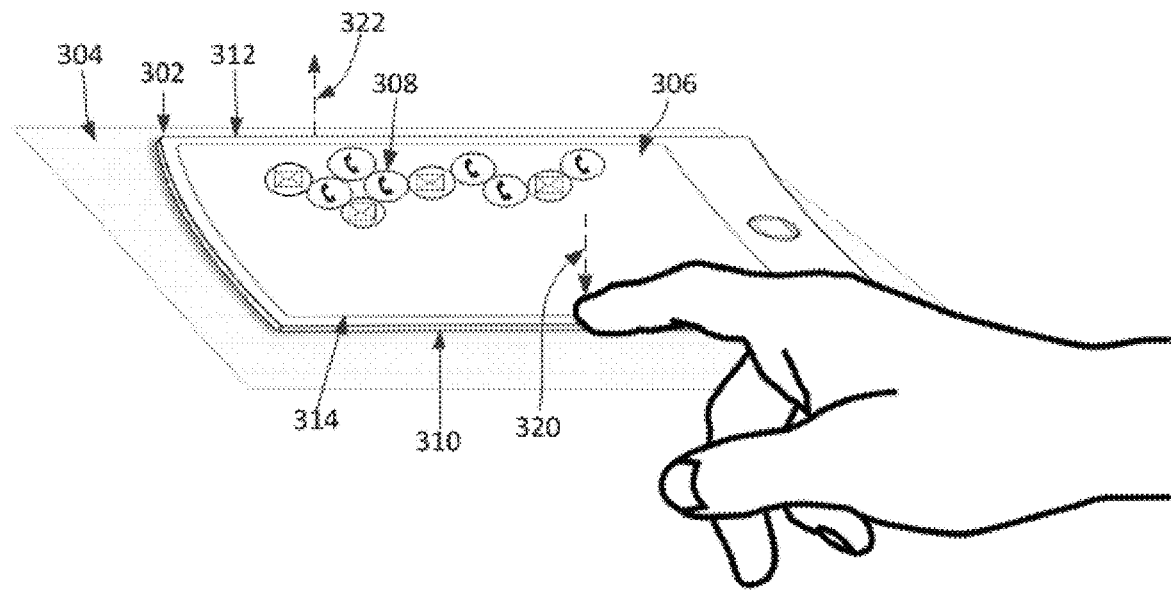
FIG. 3A shows an embodiment of a system for haptically-enabled curved devices.

FIG. 3A shows an embodiment of a system for haptically-enabled curved devices. The system comprises a curved computing device 302 positioned on a surface 304 (e.g., a table or desk). The computing device 302 comprises a curved display 306 (e.g., touch-screen display).

The computing device 302 may output one or more virtual objects 308 on the display 306. In some embodiments, the virtual objects 308 comprise notifications configured to provide information to a user. The information may comprise, for example, a phone number; a number of missed calls, text messages, and/or e-mails; an amount of time left until a specific date and/or time (e.g., until a meeting); an amount of time left to complete a download; a game status; a program status; a system status (e.g., battery level, signal strength), etc. For example, the computing device 302 may output a plurality of virtual notification bubbles. In some embodiments, each notification bubble can provide information to a user about a particular event. For example, the computing device 302 can display a notification bubble comprising a phone icon to notify the user of, e.g., a missed phone call. The computing device 302 can display a notification bubble comprising an envelope icon to notify the user of, e.g., a text message or an e-mail.

In some embodiments, the virtual objects 308 are customizable. In one embodiment, the computing device 302 may display a graphical user interface (GUI) with which a user can interact (e.g., via a touch-screen display) to customize one or more characteristics (e.g., a type, size, color, shape, number, and/or grouping) of the virtual objects 308. In such an embodiment, the computing device 302 may detect user interactions with GUI features (e.g., virtual buttons, sliders, check boxes, knobs, and/or widgets) and responsively alter a characteristic of the virtual objects 308. For example, the computing device 302 may output a virtual slider that a user can interact with to, e.g., change the diameter of the virtual notification bubbles. In such an embodiment, the computing device 302 may detect a user sliding the virtual slider in a direction and, e.g., increase the diameter of the virtual notification bubbles.

In some embodiments, the computing device 302 may detect a user interaction (e.g., comprising moving the computing device 302) and execute one or more associated functions. A function, as used herein, comprises one or more digital operations. In some embodiments, a function may comprise manipulating a virtual object 308, opening a webpage, initiating printing of a document, sending an e-mail or text message, determining information about a virtual object 308 (e.g., by querying one or more servers), calling a phone number, saving data, recording a sound, removing an entry from a list, outputting a sound, playing media content, sending data, and/or receiving data.

For example, in some embodiments the computing device 302 detects a user interaction (e.g., via an accelerometer or gyroscope) comprising rolling the computing device 302 along the surface 304 (toward or away from the user) and executes an associated function. For instance, a user may push down (e.g., as shown by dashed arrow 320) on one side 310 of the computing device 302. The curvature in the computing device 302 may cause the computing device 302 to roll along the surface 304 toward the user. This may cause an opposite side 312 of the computing device 302 to lift upward and away from the surface 304 (e.g., as shown by dashed line 322). In some embodiments, the computing device 302 can detect the roll and, e.g., wake the computing device 302 up from a sleep mode.

In some embodiments, the computing device 302 detects a user interaction comprising a back-and-forth rocking motion and executes an associated function. For example, after pressing down on the side 310 of the computing device 302, the user may release the side 310 of the computing device 302. The curvature in the computing device 302 (and gravity) may cause the computing device 302 to periodically roll away from the user and back toward the user in a rocking motion. The computing device 302 may detect the rocking motion and, e.g., put the computing device 302 into a sleep mode. In another embodiment, the user may rock the computing device 302 back-and-forth on the surface 304. The computing device 302 may detect the rocking motion and, e.g., erase or visually scramble content on the screen (to make it unperceivable to a user).

In some embodiments, the computing device 302 manipulates virtual objects 308 based on a simulated physics model. A simulated physics model comprises a mathematical model and/or a set of rules configured to simulate at least some aspects of natural physical laws, such as conservation of energy, Newton's laws, gravity, and other natural phenomena within a simulated environment. The simulated physics model may dictate how virtual objects 308 move and/or interact within the simulated environment. For example, the computing device 302 may generate a simulated physics model based on various characteristics of the virtual objects 308, such as the virtual sizes, shapes, materials, densities, and weights of the virtual objects 308. In some embodiments, the computing device 302 may generate the simulated physics model based on characteristics of the computing device 302. For example, the computing device 302 may generate the simulated physics model based at least in part on the orientation, curvature in, size, and shape of the computing device 302 (or the display 306). The computing device 302 may move the virtual objects 308 around the display 306, or otherwise manipulate the virtual objects 308, in accordance with the simulated physics model.

Figure 3B:
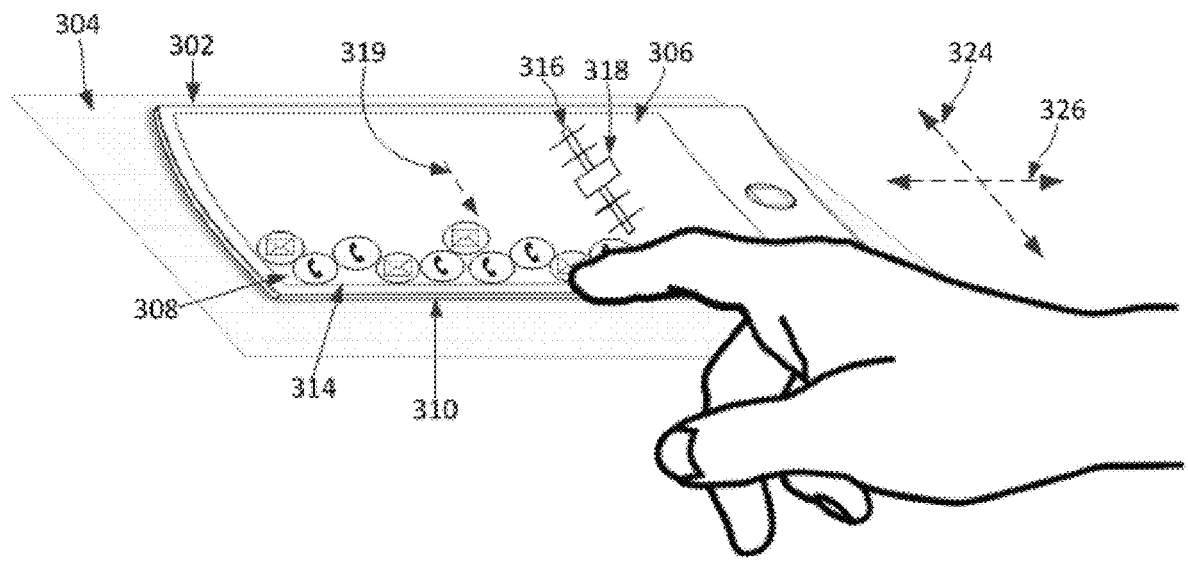
FIG. 3B shows another embodiment of a system for haptically-enabled curved devices.

For example, the computing device 302 may detect a user pushing down on a side 310, e.g., to roll the computing device 302 toward the user. In some embodiments, as one side 312 of the computing device 302 lifts upward (e.g., as shown by dashed arrow 322) and the other side 310 of the computing device 302 rolls downward, the computing device 302 may cause the virtual objects 308 to "fall" toward the lower edge 314 of the display 306, e.g., as shown by the dashed line 319 in FIG. 3B. This may simulate gravitational effects on the virtual objects 308. In some embodiments, the virtual objects 308 may fall at various rates (e.g., if the virtual objects 308 are assigned different virtual weights), bounce against each other, and/or bounce off the edge of the display 306 in accordance with the simulated physics model. This may virtually simulate gravity, laws of conservation of energy, etc. For example, based on the strength of gravity in the simulated physics model, the virtual objects 308 may or may not bounce back up (away from the lower edge 314 of the display 306) upon impacting the lower edge 314 of the display 306.

In some embodiments, the characteristics of the simulated physics model are customizable. In one embodiment, the computing device 302 may display a GUI with which a user can interact (e.g., via a touch-screen display) to customize one or more characteristics (e.g., a strength of gravity, a force of impact, a dampening of an impact) of the simulated physics model. In such an embodiment, the computing device 302 may detect user interactions with GUI features and responsively alter a characteristic of the simulated physics model.

For example, in one embodiment, the computing device 302 may detect user input configured to modify the strength of virtual gravity within the simulated physics model. The computing device 302 may, e.g., reduce the gravitational effects on the virtual objects 308 based on the user input. In another embodiment, the computing device 302 may detect user input configured to constrain gravitational effects to one or more axis. The computing device 302 may constrain gravitational forces to, e.g., the X-axis 324 based on user input. This can prevent unintended movement of the virtual objects 308 along another axis (e.g., the Y-axis 326). In still another embodiment, the computing device 302 may detect user input configured to modify impact forces (e.g., among virtual objects 308, and/or between virtual objects 308 and an edge of the display 306). The computing device 302 may, e.g., reduce impact forces among the virtual objects 308 based on user input.

In some embodiments, the computing device 302 is configured to output one or more haptic effects upon the occurrence of an event. For example, the computing device 302 may output a haptic effect upon a virtual object 308 impacting another virtual object 308 and/or an edge (e.g., lower edge 314) of the display 306. In one such embodiment, the computing device 302 may detect a user rolling the computing device 302 and cause the virtual notification bubbles to fall toward the lower edge 314 of the display 306. The computing device 302 may output a vibration each time a notification bubble impacts the lower edge 314 of the display 306. In such an embodiment, the notification bubbles may start at different distances from the lower edge 314 of the display and impact the lower edge 314 of the display 306 at different times. This may allow the user to distinctly perceive each vibration associated with an impact. Based on the number of vibrations, the user may be able to determine the number of notifications, without visually focusing on the display 306. In some embodiments, the computing device 302 may output different haptic effects for different kinds of notifications. For example, the computing device 302 may output an intense vibration for a missed phone call notification and a low-magnitude vibration for an e-mail notification. This may allow the user to determine the types of the notifications, without visually focusing on the display 306.

In some embodiments, the computing device 302 may determine a characteristic (e.g., type, duration, magnitude) of a haptic effect based on the simulated physics model. For example, as discussed above, the computing device 302 may output a haptic effect upon a notification bubble impacting the lower edge 314 of the display 310. In one such embodiment, the computing device 302 may determine the force of the impact using the simulated physics model. The computing device 302 may determine the magnitude of the haptic effect based on the force of the impact. For example, if the force of the impact is large, the computing device 302 may determine a high-magnitude haptic effect.

As another example, the computing device 302 may output virtual objects 308 comprising granular materials (e.g., sand). Upon a user moving the computing device 302 (e.g., rocking the computing device 302 on the surface 304), the computing device 302 may output a haptic effect configured to simulate the granular materials shifting or sliding over a surface (e.g., the curved surface of the display 306). For example, the computing device 302 may use the simulated physics model (e.g., which may rely on granular synthesis, particle physics, or other techniques) to determine how the granular materials would slide over a surface with the same curvature as the computing device 302. In such an embodiment, the computing device 302 may correspondingly move the granular materials around the display 306 to visually simulate movement of the granular materials. The computing device 302 may additionally or alternatively output haptic effects, such as vibrations, configured to physically simulate the movement of the granular materials. In some embodiments, the computing device 302 may additionally or alternatively output sound associated with the virtual object. For example, the computing device 302 may output a sound, e.g., configured to simulate the sound of moving sand. This may provide a more realistic experience to the user. In some embodiments, this may provide entertainment to the user, e.g., to pass the time.

As still another example, the computing device 302 may output virtual objects 308 comprising a liquid (e.g., water). Upon a user moving the computing device 302 (e.g., rolling the computing device), the computing device 302 may output a haptic effect configured to simulate the liquid sliding over a surface (e.g., the curved surface of the display 306). For example, the computing device 302 may use the simulated physics model to determine how the liquid would slide over, or puddle on, a surface with the same curvature as the computing device 302. In such an embodiment, the computing device 302 may correspondingly move the liquid around the display 306 to visually simulate movement of the liquid. The computing device 302 may additionally or alternatively output haptic effects, such as vibrations and textures, configured to physically simulate the movement of the fluid. In some embodiments, the computing device 302 may additionally or alternatively output sound, e.g., configured to simulate the sound of moving water.

In some embodiments, the computing device 302 may determine the haptic effect based on a characteristic (e.g., a material, size, shape, virtual weight or density, location) of a virtual object 308. For example, the virtual notification bubbles may be configured to, e.g., look like marbles. For instance, the notification bubbles may comprise a virtual glass texture. Upon a user interacting with a notification bubble via the display 306 (e.g., a touch-screen display), the computing device 302 may output a haptic effect, e.g., configured to simulate the glass texture. This may provide a more realistic and immersive user experience.

In some embodiments, the computing device 302 may determine a haptic effect based on a user interaction with the computing device 302. For example, referring to FIG. 3B, the computing device 302 may output a virtual user interface widget, such as a virtual slider 316, on the display 306. The user interface widget may be, for example, associated with a music application executing on the computing device 302. The computing device 302 may detect the user rolling the computing device 302 and manipulate the user interface widget based on the roll. For example, the computing device 302 may detect the user rolling the computing device 302 (e.g., toward the user) and move a slider bar 318 of a virtual slider 316 in increments. This may, for example, decrease the volume of audio output by the computing device 302. In some embodiments, the computing device 302 outputs a haptic effect (e.g., a pulsed vibration or click sensation) at each increment. The haptic effects may simulate detents or otherwise simulate interacting with a slider.

In some embodiments, the computing device 302 may output a haptic effect associated with a tilt of the computing device 302. For example, in the virtual slider embodiment described above, the computing device 302 may detect the user rolling the computing device 302, such that one side 312 of the computing device 302 lifts upward (e.g., as shown by dashed arrow 322) and the other side 310 of the computing device 302 rolls downward. This may tilt the computing device 302 at an angle. The computing device 302 may output a haptic effect associated with the angle. For example, the computing device 302 may output, e.g., a vibration with a magnitude that increases as the angle increases and/or decreases as the angle decreases. This may, for example, indicate to the user how far the slider bar 318 has moved from a default position. As another example, the computing device 302 may output a haptic effect upon the angle exceeding one or more thresholds. For instance, the computing device 302 may output a click sensation upon detecting that, e.g., the computing device 302 has tilted more than 10 degrees from a previous tilt angle. This may, for example, simulate detents or another haptic effect associated with a slider.

In some embodiments, the computing device 302 may execute a shopping application. The shopping application may allow a user to purchase materials, e.g., for crafting projects. In some embodiments, computing device 302 may detect user interactions and output haptic effects simulating characteristics of the materials. For example, the computing device 302 may output a virtual object 308 comprising a material, such as plastic or wood. In some embodiments, upon the user rolling the computing device 302, the computing device 302 may output a haptic effect associated with the material. For example, the haptic effect may be configured to resist against the roll by an amount associated with the flexibility of the material. The user may perceive the haptic effect and, e.g., determine if the material suits a particular project.

In some embodiments, the computing device 302 may generate resistance by actuating a deformation haptic output device comprising, e.g., a smart gel or rheological fluid layer. In one embodiment, the deformation haptic output device may be positioned underneath a side 310 of the computing device 302 (e.g., between the computing device 302 and the surface 304). Actuating the deformation haptic output device may cause the smart gel or rheological fluid layer to expand between the computing device 302 and the surface 304. This may generate an upward force in the direction opposite to the downward force (e.g., shown by dashed line 320) applied by the user's finger. The user may perceive the upward force as resistance. In another embodiment, the deformation haptic output device may be coupled to the back of the computing device 302 (e.g., the surface of the computing device 302 contacting the surface 304). Actuating the deformation haptic output device may cause the smart gel or rheological fluid layer to flex, bend, or otherwise deform. This may cause the computing device 302 to deform. The user may perceive the deformation as the resistance.

In some embodiments, the computing device 302 may output a haptic effect upon the user countering the resistance of the computing device 302 with an amount of force above a threshold. For example, in the crafting application embodiment described above, the user may counter the resistance from the computing device 302 with an amount of force, e.g., exceeding the tensile strength of the material. In some embodiments, the computing device 302 may detect the force exerted by the user and output a haptic effect (e.g., a jolt sensation) configured to, e.g., simulate the breaking the material. This may realistically simulate an interaction with the material to the user.

In some embodiments, the computing device 302 may output haptic effects configured to simulate, e.g., the resistance and/or breaking of each of the layers in a multi-layered material. For example, the computing device 302 may resist against the user with an amount of force associated with the elasticity of a first layer of material, e.g., as described above. Upon the computing device 302 detecting the user countering the resistance with an amount of force exceeding the tensile strength of the first layer of material, the computing device 302 may output a haptic effect comprising, e.g., a jolt sensation. This may simulate breaking the first layer of material. In such an embodiment, the computing device 302 may continue to resist the user, e.g., with an amount of force associated with the elasticity of a second layer of material. Upon the computing device 302 detecting the user countering the resistance with an amount of force exceeding the tensile strength of the second layer of material, the computing device 302 may output a haptic effect (e.g., another jolt sensation and/or a high-magnitude vibration). This may simulate breaking the second layer of material. In some embodiments, this process may repeat for as many layers are in the material.

In some embodiments, the computing device 302 may output haptic effects configured to stop the computing device 302 from rocking back-and-forth, or otherwise slow the rocking. For example, after pressing down on the side 310 of the computing device 302, the user may release the side 310 of the computing device 302. This may cause the computing device 302 to rock back-and-forth. In some embodiments, the computing device 302 may output a deformation haptic effect configured to stop or prevent the computing device 302 from rocking. For example, the computing device 302 may actuate a deformation haptic output device comprising, e.g., a smart gel or rheological fluid layer. In one embodiment, the deformation haptic output device may be positioned underneath a side 310 of the computing device 302 (e.g., between the computing device 302 and the surface 304). Actuating the deformation haptic output device may cause the smart gel or rheological fluid layer to expand between the computing device 302 and the surface 304. This may stop, slow, or prevent the rocking. In other embodiments, the computing device 302 may output pulses, jolts, or other haptic effects at intervals configured to stop or slow the rocking.

In some embodiments, the computing device 302 may determine whether the computing device 302 is positioned on a surface 304 or in a user's hand. For example, the back surface of the computing device 302 (e.g., the surface of the computing device 302 contacting the surface 304 in FIG. 3A) may comprise one or more sensors (e.g., pressure and/or capacitive sensors). The computing device 302 may receive data from the sensors and determine, based on the data, if the computing device 302 is being held or is resting on the surface 304. For example, the computing device 302 may comprise a long, narrow pressure sensor positioned in the middle of, and along a longitudinal axis (e.g., Y-axis 326) of, the back surface if the computing device 302. In such an embodiment, the computing device 302 may receive data from the pressure sensor consistent with the computing device 302 resting on a flat surface and determine that the computing device 302 is on a surface 304. As another example, the computing device 302 may comprise a capacitive sensor coupled to the back surface of the computing device 302. Upon a user holding the computing device 302 (e.g., and contacting the capacitive sensor), the capacitance detected by the capacitive sensor may change. The computing device 302 may detect the changed capacitance and determine whether the user is holding the computing device 302 based on the change.

In some embodiments, the computing device 302 may determine a visual and/or haptic effect based on whether the computing device 302 is positioned on a surface 304 or in a user's hand. For example, if the computing device 302 is being held by the user, the user may perceive visual and/or haptic effects based on a simulated natural phenomenon (e.g., simulated gravity from the simulated physics model) as confusing and/or disorienting. For instance, the user may perceive a virtual object 308 moving around the display 306 in accordance with simulated gravity, and associated haptic effects, as confusing. Thus, in one embodiment, the computing device 302 may manipulate characteristics of the simulated physics model to turn off, reduce, or otherwise modify the effects of simulated natural phenomena, e.g., on the movements of the virtual object 308 and/or on haptic effects.

Figure 4A:
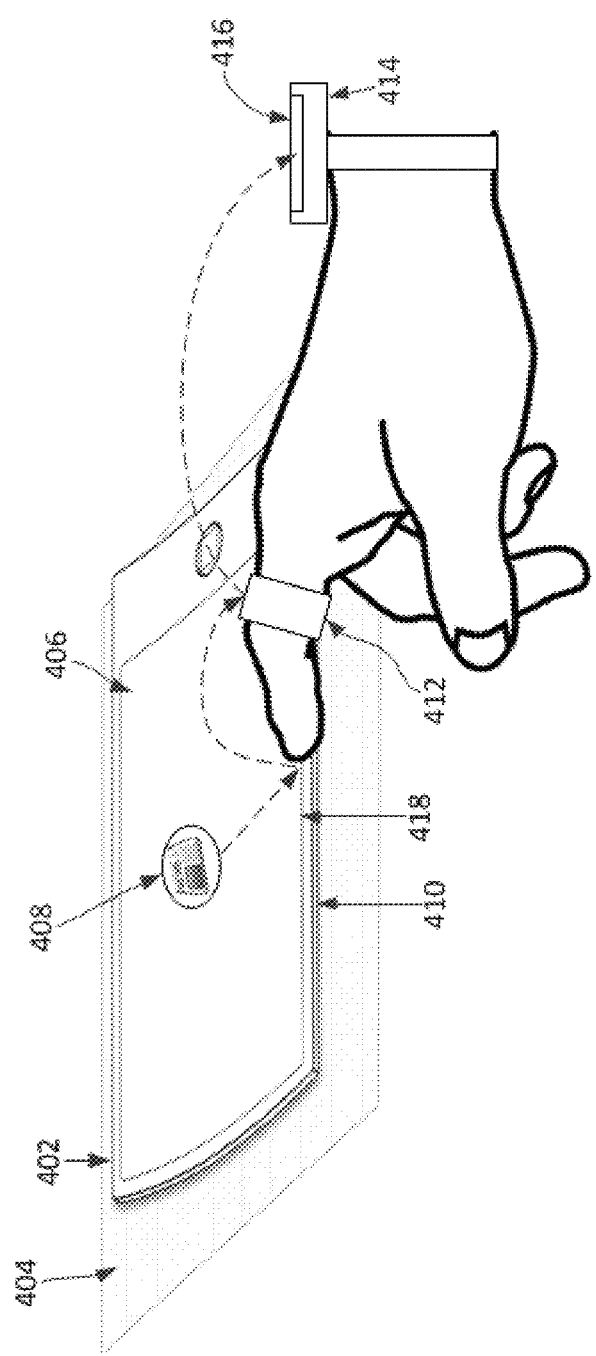
FIG. 4A shows yet another embodiment of a system for haptically-enabled curved devices.

FIG. 4A shows yet another embodiment of a system for haptically-enabled curved devices. The system comprises a curved computing device 402 positioned on a surface 404. The system also comprises wearable computing devices 412, 414. A wearable computing device 412 or 414 may comprise a computing device (e.g., with a processor, memory, network interface, haptic output device, and/or other components) that is configured to be worn on or around a body part of the user. In some embodiments, a wearable computing device 412 or 414 may be associated with a shoe, an armband, a sleeve, a jacket, glasses, a glove, a wristband, a bracelet, an article of clothing, a hat, a headband, and/or jewelry. In the embodiment shown in FIG. 4A, the user is wearing a wearable computing device 412 comprising a ring and a wearable computing device 414 comprising a watch. The wearable computing devices 412, 414 may be in wired or wireless communication with each other and/or the computing device 402.

The computing device 402 may detect one or more user interactions and execute one or more associated functions. For example, the user may press on an edge 410 of the computing device 402, causing the computing device 402 to roll, e.g., toward the user. In some embodiments, the computing device 402 may detect the roll and, e.g., transfer data from the computing device 402 to another device (e.g., wearable computing device 414). For example, the computing device 402 may detect the strength of wireless signals emitted by nearby devices. In some embodiments, the computing device 402 may determine which nearby device is closest based on the strength of the wireless signals. In one such embodiment, the computing device 402 may transmit the data to the closest device (e.g., wearable computing device 412). In another embodiment, the computing device 402 may detect devices (e.g., wearable computing devices 412, 414) that are wirelessly connected to the computing device 402 via, e.g., Bluetooth. In such an embodiment, the computing device 402 may transmit the data to one or all of the connected devices. In still other embodiments, the computing device 402 may receive a user selection of a destination device and transmit the data to the destination device.

In the embodiment shown in FIG. 4A, the computing device 402 is configured to transmit data to the wearable computing devices 412, 414. For example, the computing device 402 may output (e.g., via display 406) a virtual object 408 representing, e.g., an available news clip. Upon the user tilting or rolling the computing device 402, the computing device 402 may transfer data associated with the virtual object 408 (e.g., the content of the news clip) to, e.g., wearable computing device 414. In some embodiments, the wearable computing device 414 may receive the data and, e.g., output the virtual object 408 and/or at least a portion of the data (e.g., a portion of the news clip) on a display 416.

In some embodiments, the system outputs visual and/or audio effects configured to enhance the user experience of, e.g., a data transfer. For example, upon the user tilting or rolling the computing device 402, the computing device 402 may manipulate the virtual object 408 on the display 406 in a way that, e.g., visually simulates the data transfer. In one such embodiment, the computing device 402 may visually cause the virtual object 408 to "roll" down the display 406, e.g., until the virtual object 408 impacts the edge 418 of the display 406. After the virtual object 408 impacts the edge 418 of display 406 it may "jump" off of the display 406, e.g., simulating the appearance a ball rolling off a ramp. In some embodiments, the wearable computing device 414 may thereafter (e.g., upon completion of the data transfer) depict the virtual object 408 rolling onto the display 416. The user may perceive this series of visual events as simulating the transfer of the data from the computing device 402 to the wearable computing device 414.

In some embodiments, the system outputs haptic effects configured to enhance the user experience, e.g., of the data transfer. For example, in the rolling and jumping embodiment described above, the computing device 402 may output a first haptic effect (e.g., a rumbling sensation) as the virtual object 408 rolls down the display 406. The computing device 402 may output a second haptic effect (e.g., a jolt or high-magnitude vibration) upon the virtual object 408 impacting the edge 418 of the display 406 and/or jumping off the display 406. In some embodiments, the wearable computing device 414 may additionally or alternatively output haptic effects. For example, in one embodiment, upon completion of the data transfer, the wearable computing device 414 may output a pop sensation. Upon the data rolling on to the display 416 of the wearable computing device 414, the wearable computing device 414 may output a haptic effect comprising, e.g., a rumbling sensation. The user may perceive the series of haptic effects as simulating the flow of the data from the computing device 402 to the wearable computing device 414, and/or enhancing the realism of the visual events.

In some embodiments, the system may output visual, audio, and/or haptic effects via a plurality of wearable computing devices 412, 414. The system may coordinate the output, type, and duration of the visual, audio, and/or haptic effects to provide enhanced experiences to the user. For example, in some embodiments, the computing device 402 and wearable computing devices 412, 414 output haptic effects configured to cause the user to perceive the data as transferring from the computing device 402, to the wearable computing device 412, and then to the wearable computing device 414 (e.g., as depicted by the dashed arrow). For example, upon the user tilting or rolling the computing device 402, the computing device 402 may cause the virtual object 408 to roll down and impact the edge 418 of the display 406, and may output associated haptic effects, e.g., as described above. In some embodiments, the wearable computing device 412 may thereafter (e.g., 200 milliseconds later) output a haptic effect (e.g., a short vibration). The user may perceive this haptic effect as the data "impacting" the wearable computing device 412. Thereafter (e.g., 120 milliseconds after the wearable computing device 412 outputs a haptic effect), the wearable computing device 414 may output visual and/or haptic effects (e.g., as described above). The user may perceive this series of visual and/or haptic effects as the data (or virtual object 408) hopping between the computing device 402 and wearable computing devices 412, 414. The system can cause any number and configuration of devices (e.g., computing device 402 and wearable devices 412, 414) to output any number and/or type of visual, audio, and/or haptic effects (e.g., to simulate data transfer to a user).

In some embodiments, the system may output visual, audio, and/or haptic effects upon the user releasing the edge 410 of the computing device 402. In one embodiment, the computing device 302 may display the virtual object 408 (e.g., the virtual object 408 may reappear) upon the user releasing the edge 410 of the computing device 402. In another embodiment, the system may output visual, audio, and/or haptic effects coordinated such that the user perceives the data (or virtual object 408) as hopping from the wearable computing device 414, to the other wearable computing device 412, and then to the computing device 402. For example, wearable computing device 414 may, e.g., depict the virtual object 408 rolling off the display 416 and/or output an associated haptic effect. Thereafter (e.g., 120 milliseconds later), the wearable computing device 412 may output a haptic effect. Still later (e.g., 200 milliseconds after the wearable computing device 412 outputs the haptic effect), the computing device 402 may, e.g., depict the virtual object 408 rolling onto the display 406 and/or output haptic effects.

Figure 4B:
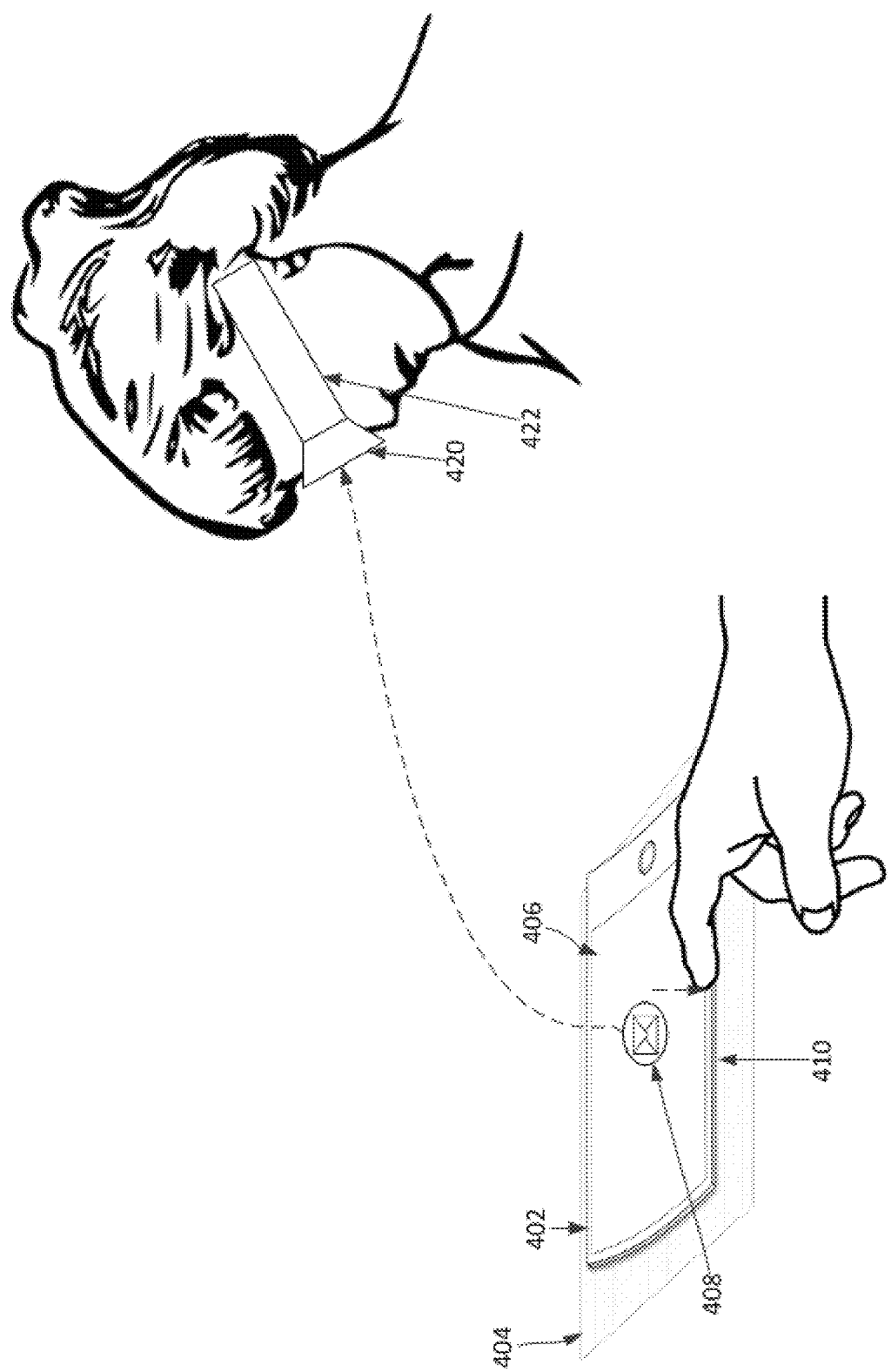
FIG. 4B shows still another embodiment of a system for haptically-enabled curved devices.

FIG. 4B shows still another embodiment of a system for haptically-enabled curved devices. In this embodiment, the user is wearing a wearable computing device 422 (e.g., goggles or glasses) comprising a head-mounted display 420.

In some embodiments, the computing device 402 may detect a user interaction and, based on the user interaction, transfer data to a remote display device (e.g., a television, wearable computing device 422, and/or a computer monitor). For example, the user may abruptly press on the edge 410 of the computing device 402. This may cause the computing device 402 to quickly roll against the surface 404 (e.g., in a catapult-like movement). In some embodiments, the computing device 402 may detect the quick roll and responsively transmit data to a remote display device. In some embodiments, the computing device 402 may select the remote display device using, e.g., any of the methods described above with respect to FIG. 4A for selecting a device to which to transmit data. The remote display device may receive the data and, e.g., display it on the display.

In some embodiments, the system may output visual, audio, and/or haptic effects configured to simulate launching the data (e.g., like a catapult) from the computing device 402 to the remote display device (e.g., as shown by the dashed line). For example, the computing device 402 may output a virtual object 408 indicative of a received e-mail. The computing device 402 may detect the user abruptly pressing down and holding the edge 410 of the computing device 402, e.g., causing the computing device 402 to rapidly roll toward the user. In some embodiments, the computing device 402 may responsively transmit data associated with the virtual object 408 (e.g., the e-mail) to the wearable computing device 422. In such an embodiment, the computing device 402 may output a haptic effect configured to, e.g., simulate the data and/or virtual object 408 being ejected from the computing device 402. For example, the computing device 402 may output a jolt sensation. Additionally or alternatively, the computing device 402 may visually simulate the virtual object 408 being launched off the display 406 and/or remove the virtual object 408 from the display 406.

In some embodiments, the wearable computing device 422 may receive the data and output, e.g., the virtual object 408 and/or at least a portion of the data via the head-mounted display 420. For example, the wearable computing device 422 may output the content of the e-mail via the head-mounted display 420. Additionally or alternatively, the wearable computing device 422 may output a haptic effect configured to, e.g., simulate the virtual object 408 and/or data impacting the wearable computing device 422. For example, the wearable computing device 422 may output a medium-magnitude vibration. In some embodiments, the combination and/or sequence of haptic effects output by the system may cause the user to perceive the virtual object 408 and/or data as being launched from the computing device 402 onto the head-mounted display 420.

In some embodiments, upon the user interacting with the computing device 402, the computing device 402 may transmit a signal to the remote display device configured to cause the remote display device to remove the virtual object 408 and/or data from the display. For example, upon the user releasing the edge 410 of the computing device 402 (e.g., such that the computing device 402 rolls back to its rest position on the surface 404), the computing device 402 may transmit a signal configured to cause the wearable computing device 422 to remove the e-mail content from the head-mounted display 420. In some embodiments, the wearable computing device 422 may output an associated haptic effect, e.g., configured to simulate the data and/or virtual object 408 being ejected from the wearable computing device 422. In some embodiments, the computing device 402 may thereafter output the data and/or the virtual object 408 on the display 406. Additionally or alternatively, the computing device 402 may output a haptic effect, e.g., configured to simulate the data and/or virtual object 408 impacting the computing device 402. In this manner, the user can pass content between displays, and visually and/or haptically perceive the data transfer.

FIG. 5 shows another embodiment of a system for haptically-enabled curved devices. The system comprises a curved computing device 502 (e.g., with a curved outer housing 504) in wired or wireless communication with an electronic device 506 (e.g., a tablet, e-reader, gaming device, smart phone, or laptop computer). The computing device 502 may act as an intermediary between the user and the electronic device 506. For example, in some embodiments, the curved computing device 502 may comprise a curved user interface for interacting with electronic device 506. In such an embodiment, the curved computing device 502 may comprise limited processing capabilities and act as an interface device for the user to interact with the electronic device 506. In other embodiments, the curved computing device 502 may comprise similar functionality as electronic device 506.

In some embodiments, a user may interact with the computing device 502 to provide input (e.g., commands) to the electronic device 506. For example, the electronic device 506 may output a video game via a display 508. The video game may comprise, e.g., a virtual catapult game. The computing device 502 may detect the user rolling, rocking, or otherwise manipulating the computing device 502 against a surface 510. For example, the computing device 502 may detect the user abruptly pressing down on an edge 512 of the computing device 502, e.g., such that the computing device 502 rolls toward the user, as indicated by the dashed lines. The computing device 502 may transmit a signal associated with the manipulation to the electronic device 506. For example, the computing device 502 may transmit a signal associated with the speed and direction of the roll (e.g., as detected by an accelerometer and/or gyroscope) to the electronic device 506. The electronic device 506 may receive the signal and execute an associated function. For example, the electronic device 506 may receive the signal and, e.g., launch a virtual rock from a virtual catapult in the video game. In one embodiment, the electronic device 506 may launch the virtual catapult with a force and direction based on the speed and direction of the roll. In some embodiments, the computing device 502 may output associated haptic effects. For example, the computing device 502 may output a vibration configured to simulate launching the virtual catapult.

In some embodiments, the computing device 502 may output data and/or haptic effects to the user based on signals from the electronic device 506. For example, in the catapult video game embodiment described above, the electronic device 506 may transmit a signal to the computing device 502 upon, e.g., the user's virtual character being struck by a virtual rock from an enemy catapult. The signal may be configured to cause the computing device 502 to, e.g., output a haptic effect, such as a high-magnitude vibration. The user may perceive the haptic effect as simulating the game event (e.g., the virtual rock hitting the user's character). In some embodiments, using the computing device 502 as an intermediary may allow the system to provide haptic effects to the user, even if the electronic device 506 lacks haptic capabilities. Using the computing device 502 as an intermediary may additionally or alternatively allow the user to input data or receive haptic effects using a curved device, even if the electronic device 506 is planar. This may enhance the user experience.

Illustrative Methods for Haptically-Enabled Curved Devices

Figure 6:
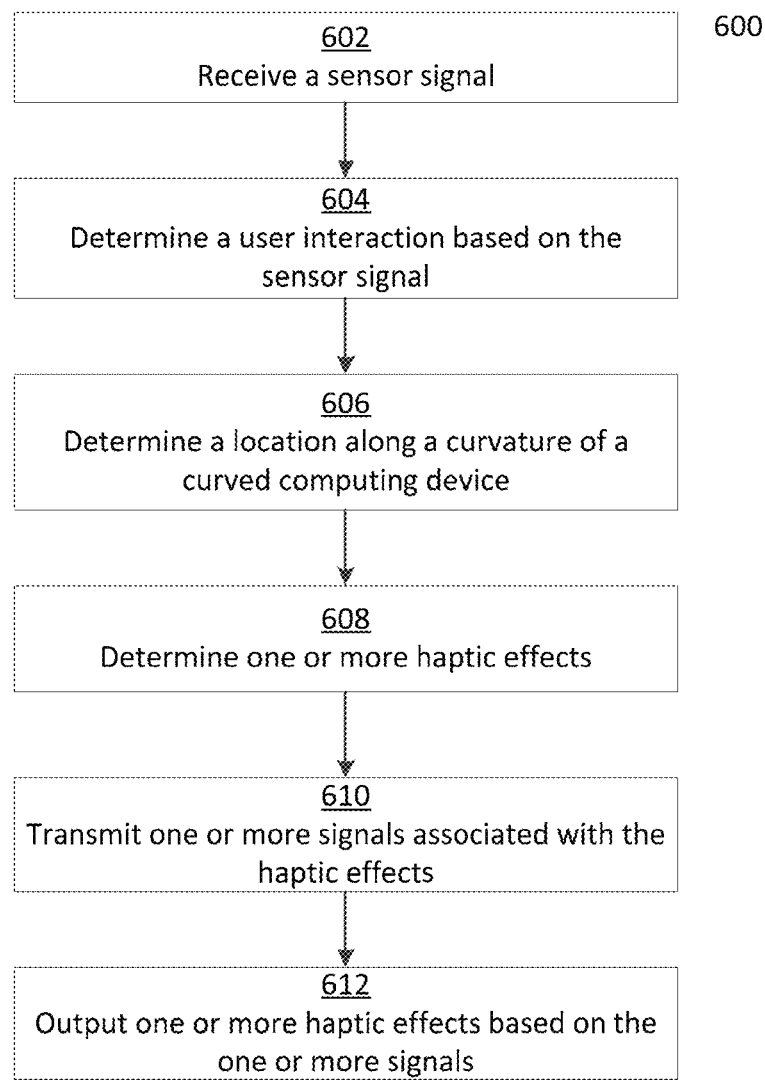
FIG. 6 is a flow chart of steps for performing a method for providing haptically-enabled curved devices according to one embodiment.

FIG. 6 is a flow chart of steps for performing a method for providing haptically-enabled curved devices according to one embodiment. In some embodiments, the steps in FIG. 6 may be implemented in program code that is executed by a processor, for example, the processor in a general purpose computer, a mobile device, or a server. In some embodiments, these steps may be implemented by a group of processors. In some embodiments one or more steps shown in FIG. 6 may be omitted or performed in a different order. Similarly, in some embodiments, additional steps not shown in FIG. 6 may also be performed. The steps below are described with reference to components described above with regard to computing device 201 shown in FIG. 2.

The method 600 begins at step 602 when the processor 202 receives a sensor signal from a sensor (e.g., sensor 230, interaction sensor 232, and/or touch sensor 208). The sensor signal can be in analog or digital form. In some embodiments, the interaction sensor 232 may comprise an accelerometer and/or gyroscope configured to detect movement of the computing device 201 and transmit an associated sensor signal to the processor 202. In such an embodiment, the sensor signal may be indicative of a user rocking, rolling, and/or otherwise manipulating the computing device 201 (e.g., on a surface). In other embodiments, the sensor signal may be associated with a user interaction (e.g., tap, gesture, swipe, two-finger pinch, etc.) with the touch sensitive surface 216. For example, the touch sensor 208 may detect a user contacting with touch sensitive surface 216 and transmit a sensor signal (e.g., comprising a location, speed, amount of pressure, etc.) associated with the contact.

The method 600 continues at step 604 when the processor 202 determines a user interaction based at least in part on the sensor signal. For example, in some embodiments, the processor 202 may determine a characteristic (e.g., a velocity, direction, and/or orientation) of a movement of the computing device 201 based on the sensor signal (e.g., from an accelerometer and/or gyroscope). In such an embodiment, the processor 202 may determine whether the user is, e.g., rolling, rocking, and/or otherwise moving (e.g., orienting) the computing device 201 based on the characteristic.

In some embodiments, the user interaction comprises interacting with a touch sensitive surface 216. The processor 202 may receive sensor signals from touch sensor 208 and determine a characteristic (e.g., direction, velocity, an amount of pressure) of the user interaction with touch sensitive surface 216. Based on the characteristic, the processor 202 may determine that the user interaction comprises, e.g., a gesture, tap, and/or other interaction with touch sensitive surface 216.

The method 600 continues at step 606 when the processor 202 determines a location along a curvature of the curved computing device 201 associated with the user interaction. For example, the user interaction may comprise a user contacting a particular position on the touch sensitive surface 216. In some embodiments, the processor 202 may use an algorithm (e.g., stored in memory 204) to determine a location along the curvature associated with the user interaction. For example, the processor 202 may use an equation that correlates positions on the touch sensitive surface 216 to locations along the curvature. The processor 202 may input the position on the touch sensitive surface 216 into the equation to calculate the associated location along the curvature.

In some embodiments, the processor 202 may use a lookup table to determine the location along the curvature. For example, the processor 202 may detect a user interacting with (e.g., contacting or tapping on) a virtual object output on a touch-screen display (e.g., comprising touch sensitive surface 216). In such an embodiment, the processor 202 may use a lookup table to map the display pixels associated with the virtual object to locations along the curvature. Because the locations of the display pixels along the curvature should be similar to the location of the user interaction, the processor 202 can use the locations of the display pixels along the curvature to determine the location of the user interaction along the curvature.

In some embodiments, the processor 202 determines the curvature in the computing device 201, e.g., prior to determining the location along the curvature of the user interaction. For example, the processor 202 may detect a user bending, flexing, or otherwise generating a curve in the computing device 201. In one such embodiment, the processor 202 may receive sensor signals from one or more sensors 230 (e.g., strain gauges, pressure sensors, or other devices) configured to detect an amount of bend in the computing device 201. The processor 202 may determine (e.g., via an algorithm and/or a lookup table) an amount of bend and/or a curvature in the computing device 201 based on the sensor signals. For example, the processor 202 may use a lookup table to map a plurality of forces (e.g., strains or pressures) from a plurality of force sensors (e.g., strain gauges or pressure sensors coupled to the computing device 201) to a particular bend or curvature in the computing device 201. As another example, the processor 202 may apply forces from a plurality of force sensors to an equation to generate a model of the curvature. In some embodiments, this may allow the computing device 201 to more accurately determine the location along the curvature of a subsequent user interaction.

In some embodiments, the computing device 201 outputs a deformation haptic effect configured to bend, flex, or otherwise change the curvature of the computing device 201. In such embodiments, the computing device 201 may subsequently determine the curvature in the computing device 201 using any of the methods described above. This may allow the computing device 201 to more accurately determine the location along the curvature of a subsequent user interaction.

The method 600 continues at step 608 when the processor 202 determines a haptic effect based at least in part on the user interaction. The processor 202 may determine the haptic effect based the type, location, duration, or other characteristics of the user interaction. For example, the processor 202 may access a lookup table stored in memory 204 to map a particular type of user interaction to a particular haptic effect. For example, the processor 202 may determine that the user interaction comprises rolling the device on a surface and consult a lookup table to determine a corresponding haptic effect (e.g., a vibration).

In some embodiments, the processor 202 may determine a haptic effect based on the location of the user interaction along the curvature. For example, the processor 202 may execute a virtual driving game in which the user drives a virtual car on a road through a valley. The curvature in the computing device 201 may represent the hills on either side of the valley. The processor 202 may detect the user moving a finger up the curvature (e.g., to drive the user's virtual car up a valley hill) and output a haptic effect comprising, e.g., a rumbling vibration. This may simulate the bumpy, unpaved nature of the road (e.g., versus a smooth road).

In some embodiments, the processor 202 determines a haptic effect based on a characteristic associated with a virtual object. For example, the computing device 201 may detect a user interaction with a virtual object and transmit a signal associated with the virtual object to the processor 202. In some embodiments, the processor 202 may determine the haptic effect based on the height, width, shape, color, location, function, texture, and/or other characteristics of the virtual object. For example, if the virtual object comprises sand, the processor 202 may determine a haptic effect comprising a sandy or grainy texture.

In some embodiments, the processor 202 determines a haptic effect based on a simulated physics model. For example, the processor 202 may apply a virtual weight, density, texture, and/or other characteristic of a virtual object to a simulated physics model. The simulated physics model may dictate how the virtual object is to move or interact with other virtual objects within a simulated environment. In one such embodiment, the processor 202 may determine a simulated impact force between the virtual object and another virtual object based on the simulated physics model. The processor 202 may determine a characteristic (e.g., magnitude, frequency, duration, type, etc.) of the haptic effect based on the impact force. For example, if the impact force is large, the processor 202 may determine a high-magnitude vibration and/or a jolt sensation. If the impact force is small, the processor 202 may determine a low-magnitude vibration or no haptic effect.

In some embodiments, the processor 202 determines a haptic effect based on a function. For example, the computing device 201 may detect the user abruptly rolling the computing device 201 and associate a particular function with the user interaction. For instance, the computing device 201 may associate a function comprising transmitting data from the computing device 201 to a remote display device (e.g., as described with respect to FIG. 4B) with the abrupt roll. In such an embodiment, the processor 202 may initiate the data transfer and/or output haptic effects associated with the data transfer. For example, the computing device 201 may output a vibration that decreases in magnitude as the data is transferred. This may, for example, indicate the progress of the data transfer to computing device 201.

In some embodiments, the computing device 201 may store associated "haptic profiles" in which a user can determine and save in memory (e.g., memory 204) a "profile" of the haptic effects the user would like associated with particular user interactions. For example, in one embodiment, a user can select from a list of options which haptic effect the user would like associated with the a user interaction comprising slowly rolling the computing device 201, abruptly rolling the computing device 201, contacting a particular area on a touch sensitive surface 216, or contacting a particular location along the curvature of the computing device 201. In some embodiments, the list may comprise, for example, haptic effects such as a low magnitude vibration, a jolt sensation, a low-magnitude vibration, and/or a pulsed vibration. In some embodiments, the processor 202 may consult with the user's haptic profile to determine which haptic effect to generate. For example, if the user's haptic profile associates a catapult-like abrupt roll with a jolt sensation, in response to detecting such an abrupt roll, the processor 202 may determine a haptic effect comprising a jolt sensation.

In some embodiments, the processor 202 determines a plurality of haptic effects. For example, the computing device 201 may output a virtual ball on a display. Upon the user interacting with (e.g., rolling) the computing device 201, the processor 202 may determine an associated haptic effect (e.g., a rumbling vibration). The haptic effect may be configured to, e.g., simulate the virtual ball rolling along the display. In some embodiments, the processor 202 may also determine another haptic effect (e.g., a pop sensation) upon the virtual ball contacting a virtual edge of the display. The haptic effect may be configured to, e.g., simulate the impact of a ball against a wall. In some embodiments, the multiple haptic effects may provide a more realistic and immersive representation of the virtual object (e.g., movement of the virtual ball around the display) to the user.

In some embodiments, the processor 202 determines a plurality of haptic effects to be output by a plurality of devices. For example, the processor 202 may determine multiple haptic effects to be coordinated and/or synchronized among a plurality of devices (e.g., as described with respect to FIGS. 4A and 4B). In one such embodiment, the processor 202 may determine a first haptic effect (e.g., a jolt sensation) to be output by the computing device 201, a second haptic effect (e.g., a pulsed vibration) to be output by a remote device (e.g., wearable computing device 412 of FIG. 4A), and/or a third haptic effect (e.g., a high-magnitude vibration) to be output by another remote device (e.g., wearable computing device 412 of FIG. 4B). The processor 202 may determine the types of, and/or coordinate the output of, the haptic effects based on one or more algorithms and/or lookup tables. For example, the processor 202 may consult a lookup table to map a "content throw" haptic effect (e.g., configured to simulate throwing content from one device to another, as described with respect to FIG. 4B) to a series of haptic effects to be output by a particular combination of devices in a specific sequence.

The method 600 continues at step 610 when the processor 202 transmits one or more signals associated with the haptic effects. In some embodiments, the signals comprise haptic signals. In such embodiments, the processor 202 may access drive signals stored in memory 204 and associated with particular haptic effects. In one embodiment, a signal is generated by accessing a stored algorithm and inputting parameters associated with a haptic effect. For example, in such an embodiment, an algorithm may output data for use in generating a drive signal based on amplitude and frequency parameters. As another example, a haptic signal may comprise data to be decoded by the haptic output device 218. For instance, the haptic output device 218 may itself respond to commands specifying parameters such as amplitude and frequency.

In other embodiments, the signals are configured to cause one or more remote devices to output the haptic effects. The processor 202 may transmit the signals to the remote devices to coordinate the output of haptic effects among the remote devices. For example, referring to FIG. 4A, the processor may transmit signals to the wearable computing devices 412, 414 configured to cause the wearable computing devices 412, 414 to output particular haptic effects at particular times. For instance, the processor may transmit a signal to the wearable computing device 414 to cause the wearable computing device 414 to output a vibration after the wearable computing device 412 outputs a haptic effect (e.g., in one embodiment, 200 milliseconds after the wearable computing device 412 outputs a haptic effect).

The method 600 continues at step 612 when one or more haptic output devices (e.g., haptic output device 218 and/or haptic output devices on remote devices) receive the one or more signals (e.g., haptic signals and/or signals transmitted by computing device 201) and output the one or more haptic effects. In some embodiments, the haptic effect may comprise a texture (e.g., sandy, bumpy, glassy, or smooth), a vibration, a change in a perceived coefficient of friction, a change in temperature, a stroking sensation, an electrotactile effect, and/or a deformation (e.g., a deformation of a surface associated with the computing device 201).

In some embodiments, the haptic effect comprises a series of haptic effects coordinated among a plurality of devices (e.g., computing device 201 and one or more remote devices). For example, the haptic effect may comprise a low-magnitude vibration output via computing device 201, a jolt output at a later time by a remote device, and high-magnitude vibration output at still a later time. In some embodiments, the user may perceive this series of haptic effects as, e.g., indicating a flow of information in a particular direction.

Advantages of Haptically-Enabled Curved Devices

There are numerous advantages to haptically-enabled curved devices. Such systems may provide more realistic or immersive user experiences. For example, in some embodiments, the curved device may output a virtual object comprising, e.g., a baby crib (such as in a nursing or caregiving application). The user may be able to virtually rock the crib by, e.g., rocking the curved device back-and-forth. In one embodiment, the curved device may output haptic effects (e.g., vibrations) configured to, e.g., simulate rocking the crib on a wooden floor or carpet. In this manner, the curvature in the curved device and/or the haptic effects may enhance the realism of an interaction with a virtual object.

In some embodiments, haptically-enabled curved devices may be configured to receive unique forms of user input, such as rolling or rocking the curved device on a surface. For example, a curved device may detect a user abruptly rolling the curved device along a surface and execute an associated function, e.g., transmitting data to a remote device. Such forms of input may more realistically simulate physical actions in the real world, e.g., launching an object with a catapult. Further, in some embodiments, the curved device may provide haptic effects associated with a user input and/or function. For example, the curved device may output a haptic effect (e.g., a pulsed vibration) configured to, e.g., confirm receipt of the user input and/or notify the user that the curved device is transmitting data. In such an embodiment, the haptic effects may allow the user to determine the state of the curved device and/or a function executing on the curved device, without having to visually focus on the curved device.

In some embodiments, haptically-enabled curved devices may provide unique forms of haptic output, such as rolling or rocking the curved device on a surface. For example, a curved device may execute a game. The object of the game may be, for instance, to tap a specific location on the curved device. In such an embodiment, the curved device may output haptic effects configured to rock and/or roll the curved device on a surface. This may make it more challenging to tap the location, providing entertainment to the user.

In some embodiments, haptically-enabled curved devices can act as an intermediary between a user and an electronic device. This may allow the user to input data or receive haptic effects using the curved device, even if the electronic device is planar and/or lacks haptic capabilities.

In some embodiments, haptically-enabled curved devices can coordinate multiple visual, audio, and/or haptic effects among multiple electronic devices to generate an enhanced user experience. For example, the curved device may coordinate the output of visual, audio, and/or haptic effects among two or more electronic devices to simulate, e.g., launching data from one electronic device to another, or data hopping between the electronic devices. This may more realistically simulate, e.g., a data transfer to the user.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may comprise computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A computing device, comprising:
   a touch-screen display having a curvature;
   a processor in communication with the touch-screen display; and
   a memory on which program code executable by the processor are stored to cause the processor to:
   detect an interaction at a location on the curvature of the touch-screen display based on a sensor signal from the touch-screen display;
   after detecting the interaction at the location on the curvature, determine an angle or a slope of the curvature at the location of the interaction;
   determine a haptic effect based at least in part on the angle or the slope of the curvature at the location of the interaction; and
   transmit a haptic signal configured to cause a haptic output device to output the haptic effect.

2. The computing device of claim 1, wherein the curvature is one of at least two curvatures defined in the touch-screen display.

3. The computing device of claim 1, wherein the computing device is a smartphone, a tablet, an e-reader, a gamepad, a portable gaming console, or a remote control.

4. The computing device of claim 1, wherein the curvature is permanently defined in the touch-screen display.

5. The computing device of claim 1, wherein the curvature defined in the touch-screen display is a first curvature, and wherein the computing device has an outer housing defining a second curvature.

6. The computing device of claim 1, further comprising a sensor configured to detect rolling of the computing device on a surface, wherein the haptic effect is a first haptic effect, and wherein the memory further includes instructions executable by the processor to cause the processor to:
   determine a second haptic effect based on detecting rolling of the computing device on the surface via the sensor; and
   transmit a signal configured to cause the second haptic effect to be output by the haptic output device.

7. The computing device of claim 1, wherein the computing device comprises the haptic output device, the haptic effect comprises a plurality of haptic effects configured to be output by multiple devices in a predetermined order, and the memory further includes instructions executable by the processor to cause the processor to:
   transmit the haptic signal to the haptic output device of the computing device to generate a first haptic effect in the plurality of haptic effects; and
   transmit a signal to a remote wearable device configured to cause the remote wearable device to output a second haptic effect in the plurality of haptic effects.

8. The computing device of claim 1, wherein the haptic effect is configured to cause the computing device to roll in a predetermined direction along a surface.

9. The computing device of claim 1, wherein the haptic effect is configured to resist or stop rolling of the computing device along a surface.

10. A method comprising:
    detecting, by a computing device, an interaction at a location on a curvature of a touch-screen display based on a sensor signal from the touch-screen display;
    after detecting the interaction at the location on the curvature, determining, by the computing device, an angle or a slope of the curvature at the location of the interaction;
    determining, by the computing device, a haptic effect based at least in part on the angle or the slope of the curvature at the location of the interaction; and
    transmitting, by the computing device, a haptic signal configured to cause a haptic output device to output the haptic effect.

11. The method of claim 10, wherein the curvature is one of at least two curvatures defined in the touch-screen display.

12. The method of claim 10, wherein the computing device is a smartphone, a tablet, an e-reader, a gamepad, a portable gaming console, or a remote control.

13. The method of claim 10, wherein the curvature is permanently defined in the touch-screen display.

14. The method of claim 10, wherein the curvature defined in the touch-screen display is a first curvature, and wherein the computing device has an outer housing defining a second curvature.

15. The method of claim 10, wherein the computing device comprises the haptic output device, and wherein the haptic effect comprises a plurality of haptic effects configured to be output by multiple devices in a predetermined order, and further comprising:
    transmitting the haptic signal to the haptic output device of the computing device to generate a first haptic effect in the plurality of haptic effects; and
    transmitting a signal to a remote wearable device configured to cause the remote wearable device to output a second haptic effect in the plurality of haptic effects.

16. A non-transitory computer-readable medium comprising program code that is executable by a processor of a computing device to cause the processor to:
    detect an interaction at a location on a curvature of a touch-screen display based on a sensor signal from the touch-screen display;
    after detecting the interaction at the location on the curvature, determine an angle or a slope of the curvature at the location of the interaction;
    determine a haptic effect based at least in part on the angle or the slope of the curvature at the location of the interaction; and
    transmit a haptic signal configured to cause a haptic output device to output the haptic effect.

17. The non-transitory computer-readable medium of claim 16, wherein the curvature is one of at least two curvatures defined in the touch-screen display.

18. The non-transitory computer-readable medium of claim 16, wherein the computing device is a smartphone, a tablet, an e-reader, a gamepad, a portable gaming console, or a remote control.

19. The non-transitory computer-readable medium of claim 16, wherein the curvature defined in the touch-screen display is a first curvature, and wherein the computing device has an outer housing defining a second curvature.

20. The non-transitory computer-readable medium of claim 16, wherein the computing device comprises the haptic output device, and wherein the haptic effect comprises a plurality of haptic effects configured to be output by multiple devices in a predetermined order, and further comprising program code that is executable by the processor to cause the processor to:
   transmit the haptic signal to the haptic output device of the computing device to generate a first haptic effect in the plurality of haptic effects; and
   transmit a signal to a remote wearable device configured to cause the remote wearable device to output a second haptic effect in the plurality of haptic effects.

* * * * *